Dec. 31, 1940.     R. E. ZERUNEITH     2,226,916
WIRE STITCHER
Filed May 11, 1939     19 Sheets-Sheet 3
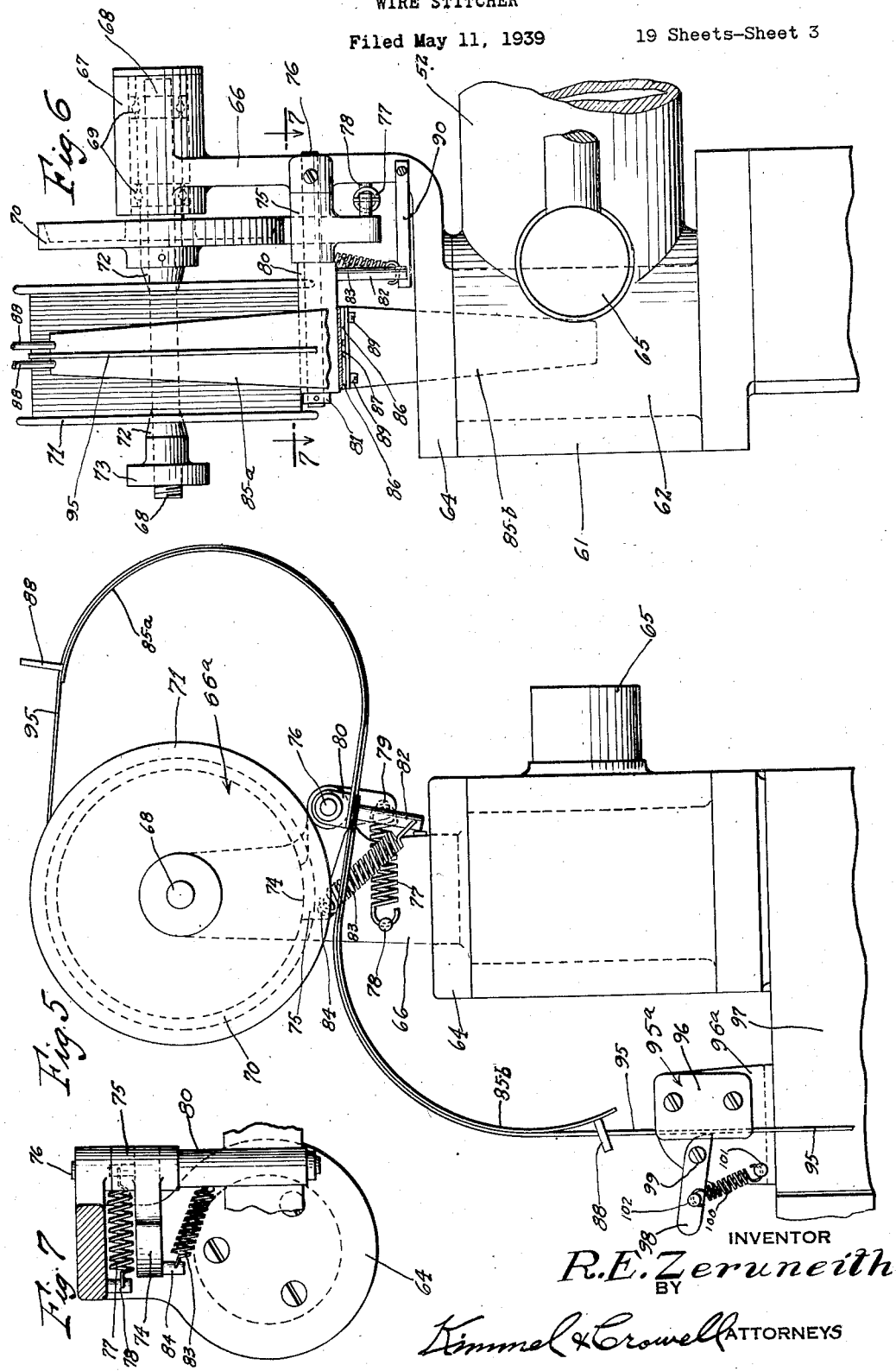
INVENTOR
R. E. Zeruneith
BY
Kimmel & Crowell ATTORNEYS

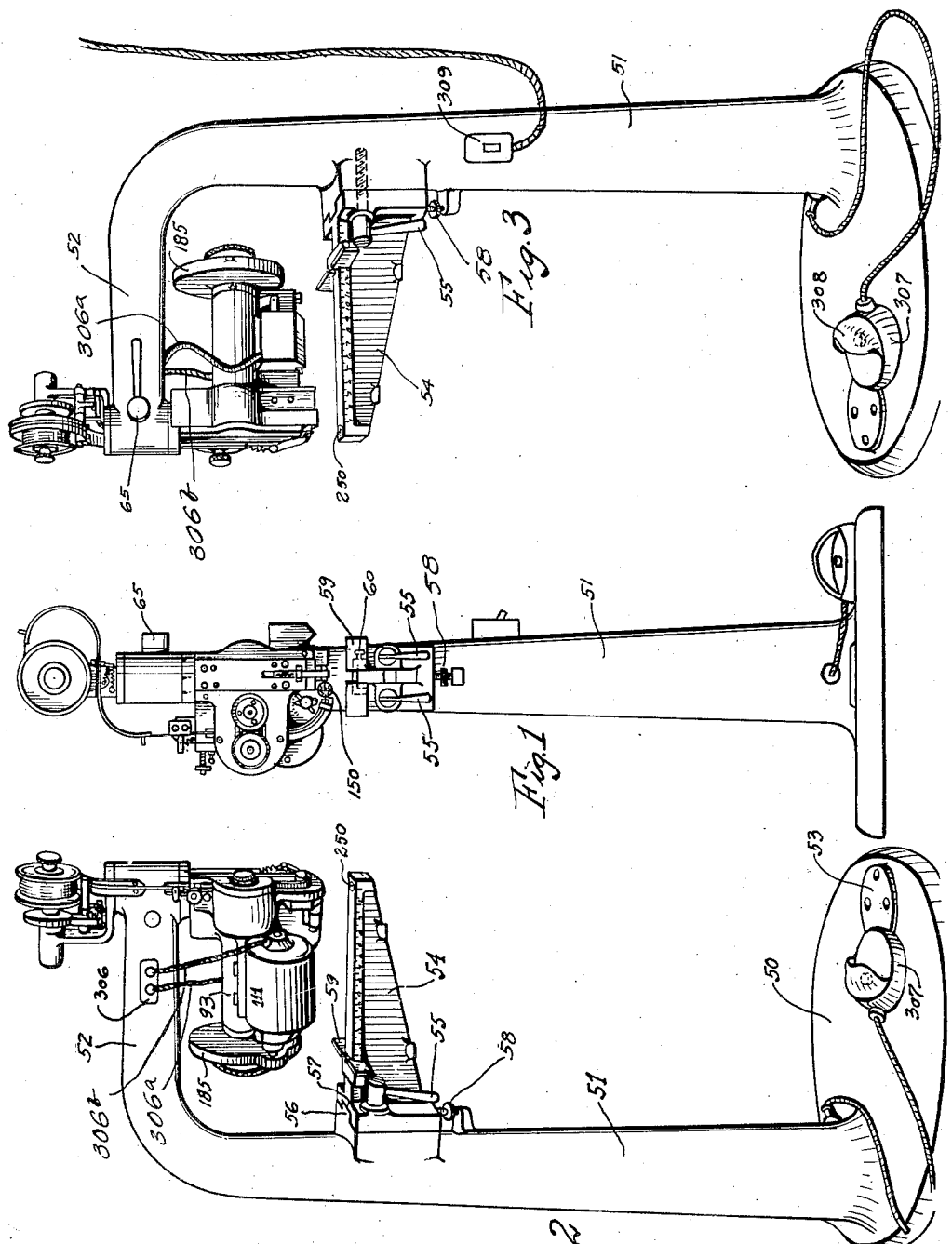

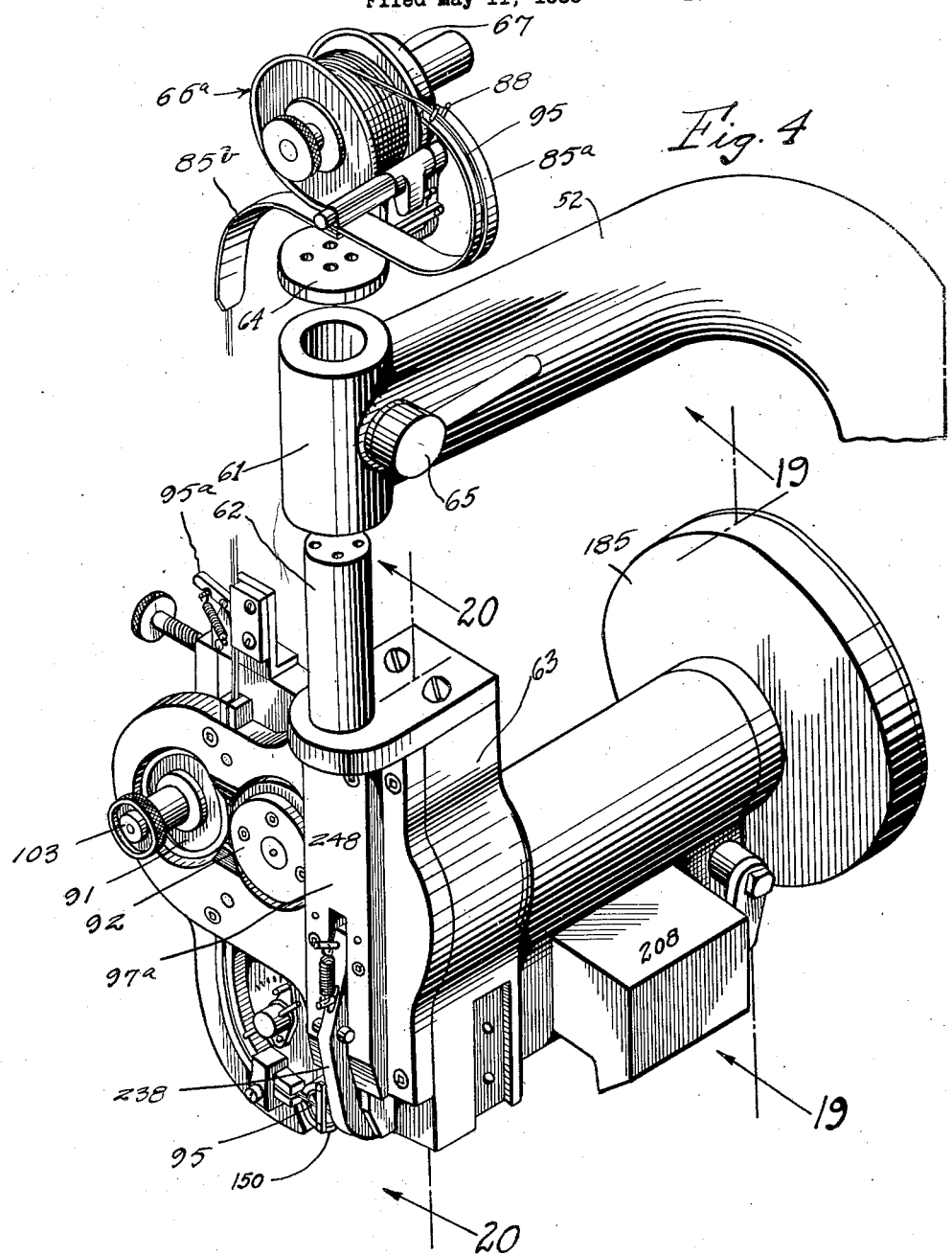

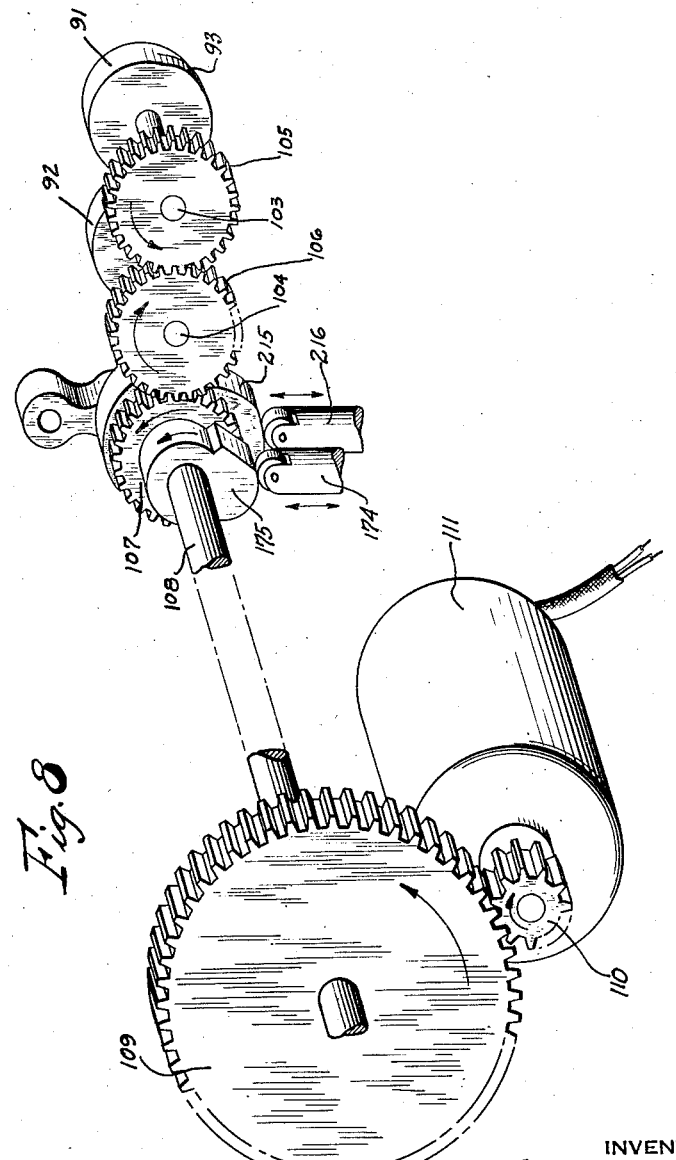

Dec. 31, 1940. R. E. ZERUNEITH 2,226,916
WIRE STITCHER
Filed May 11, 1939 19 Sheets-Sheet 5
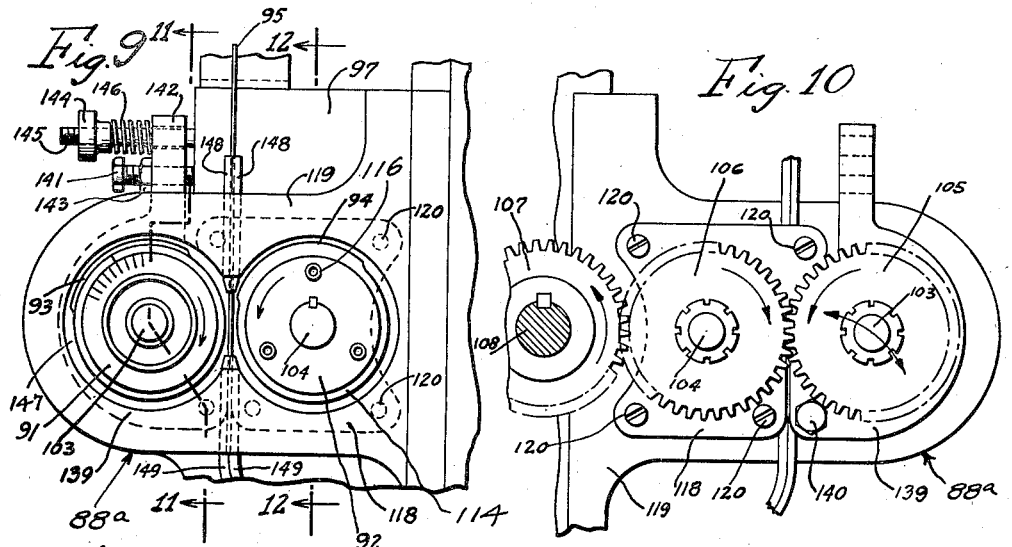
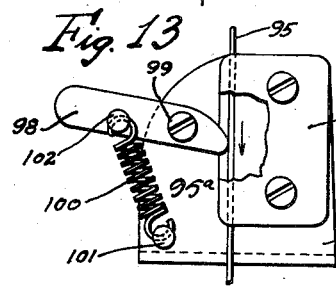
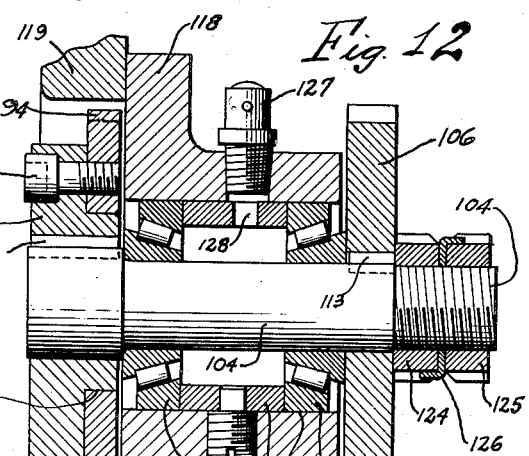
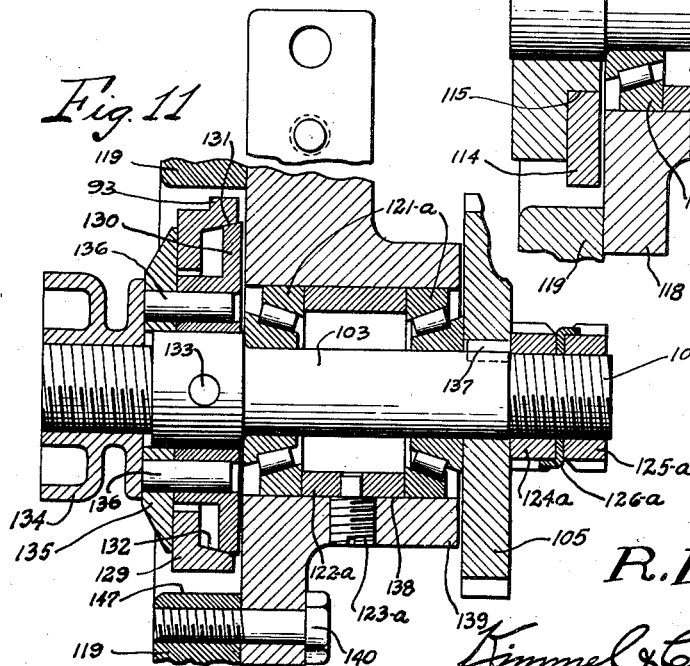
INVENTOR
R. E. Zeruneith
BY
Kimmel & Crowell ATTORNEYS Dec. 31, 1940.  R. E. ZERUNEITH  2,226,916
WIRE STITCHER
Filed May 11, 1939   19 Sheets-Sheet 6
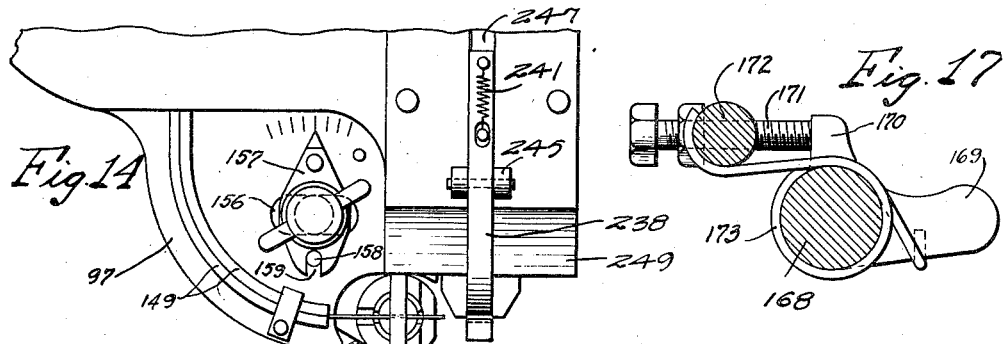
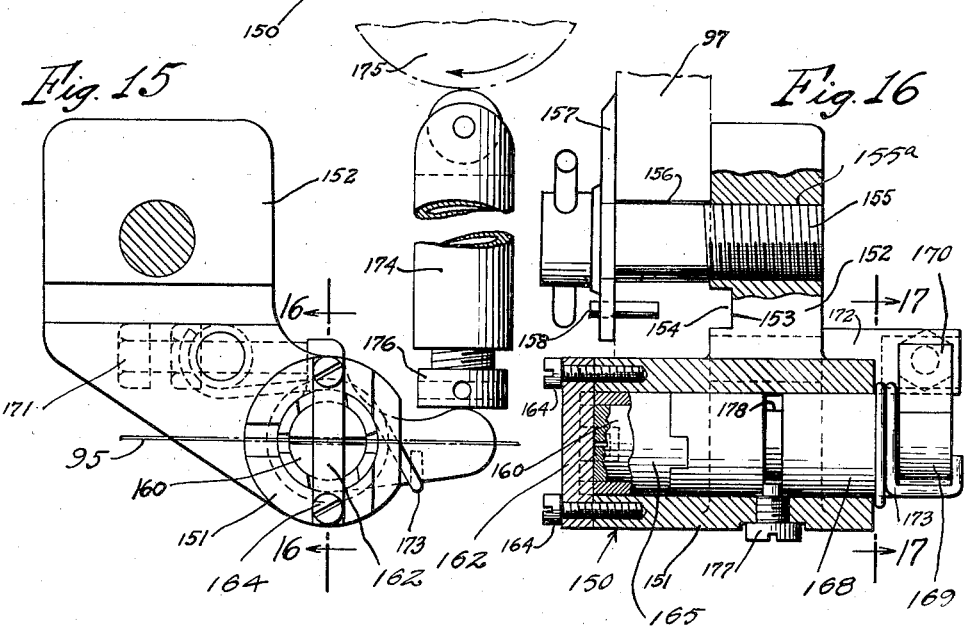
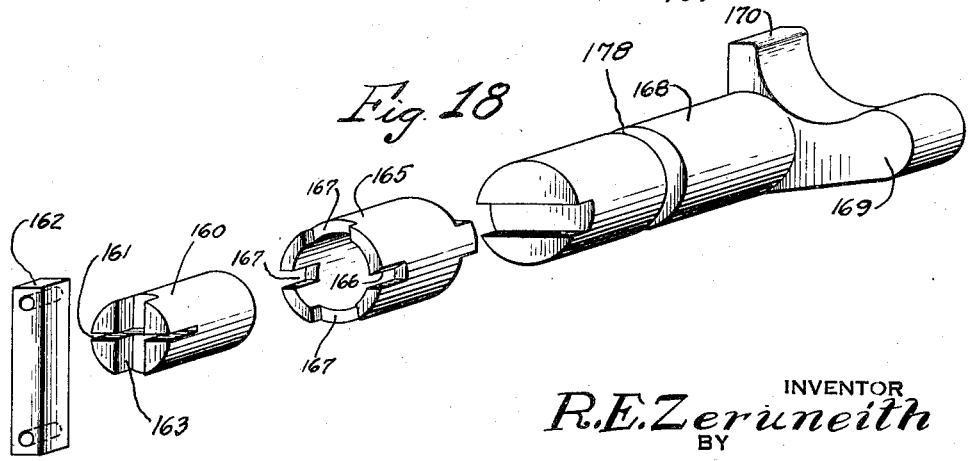
INVENTOR
*R.E. Zeruneith*
BY
*Kimmel & Crowell* ATTORNEYS

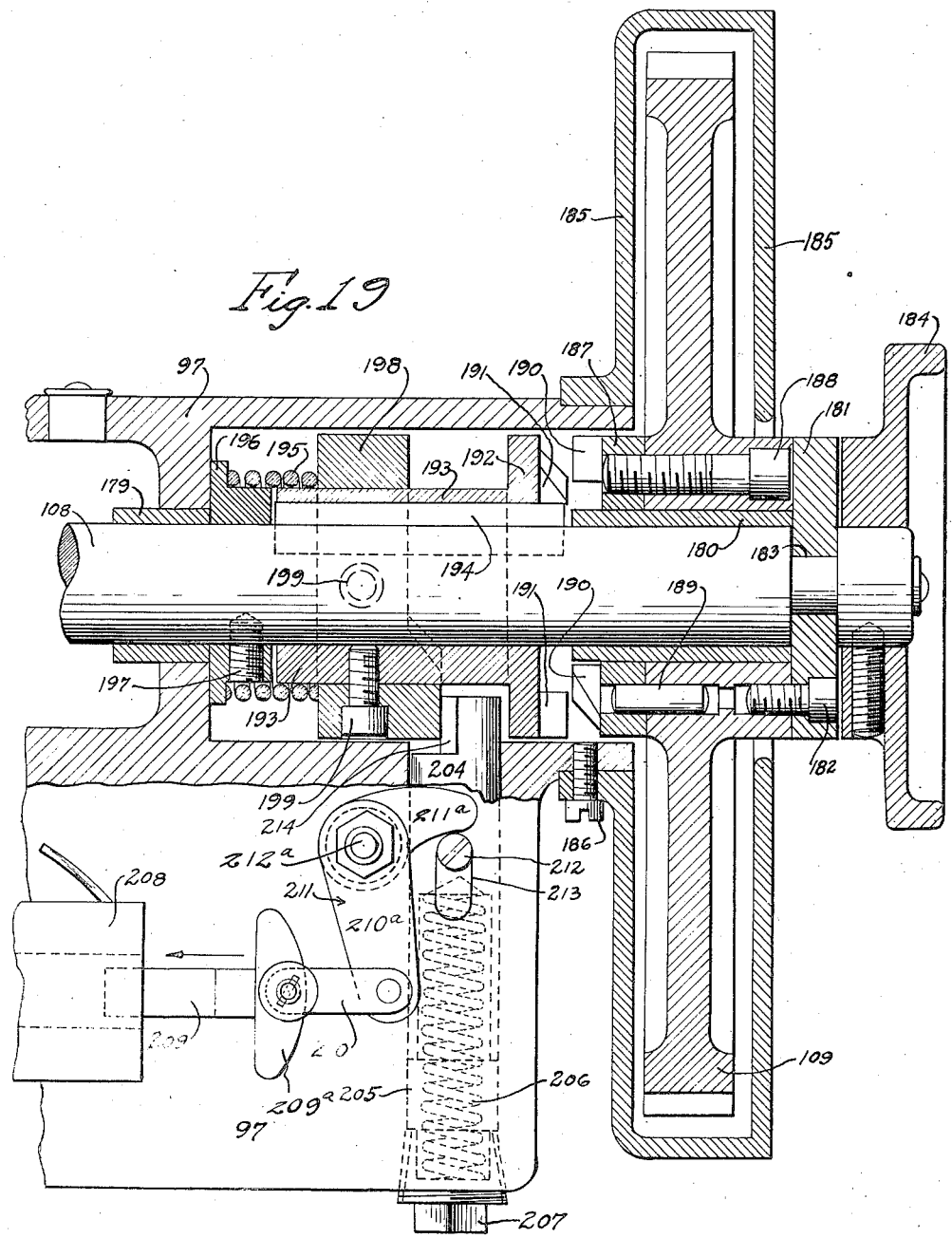

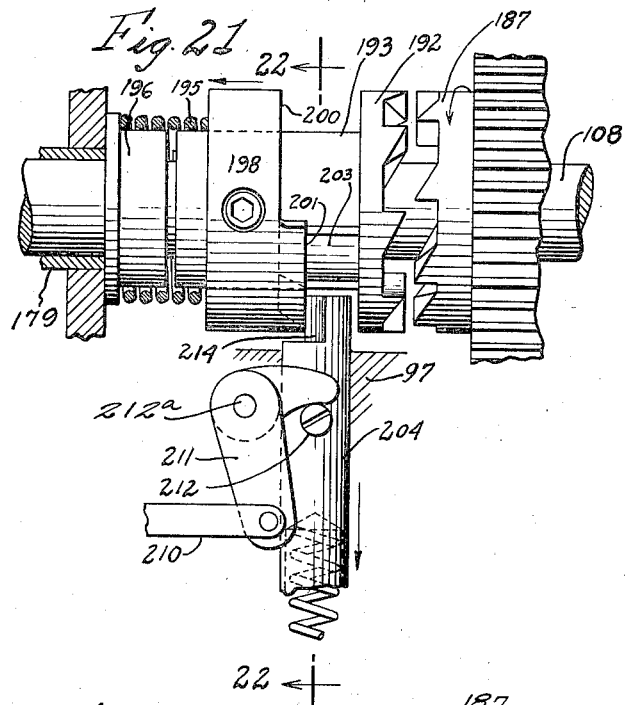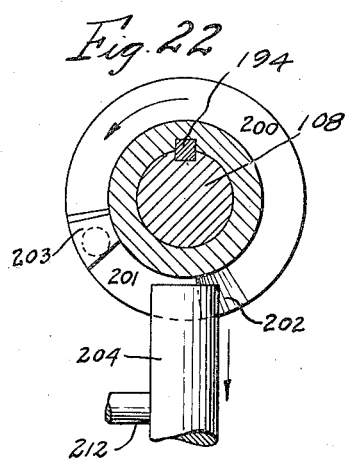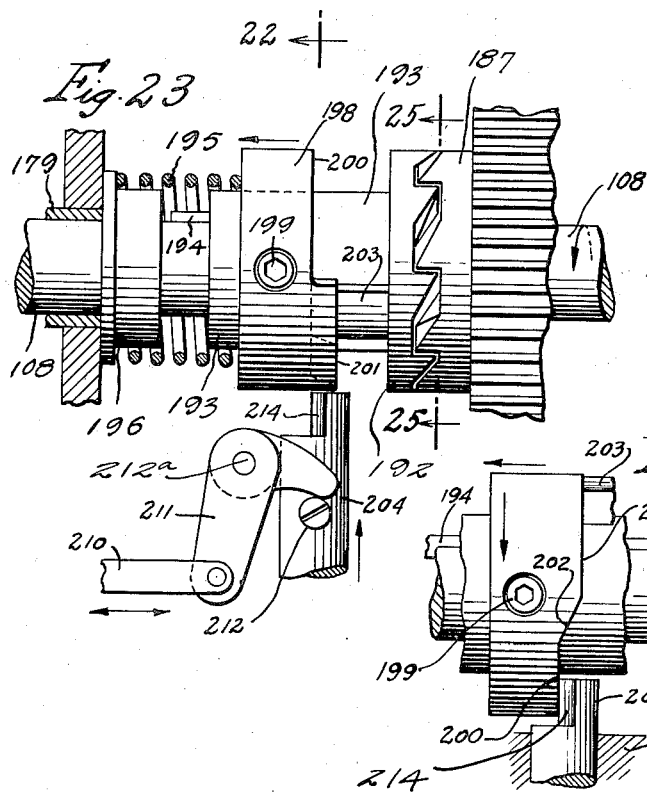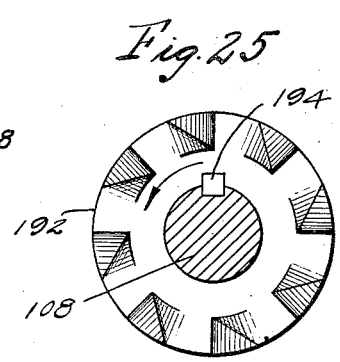

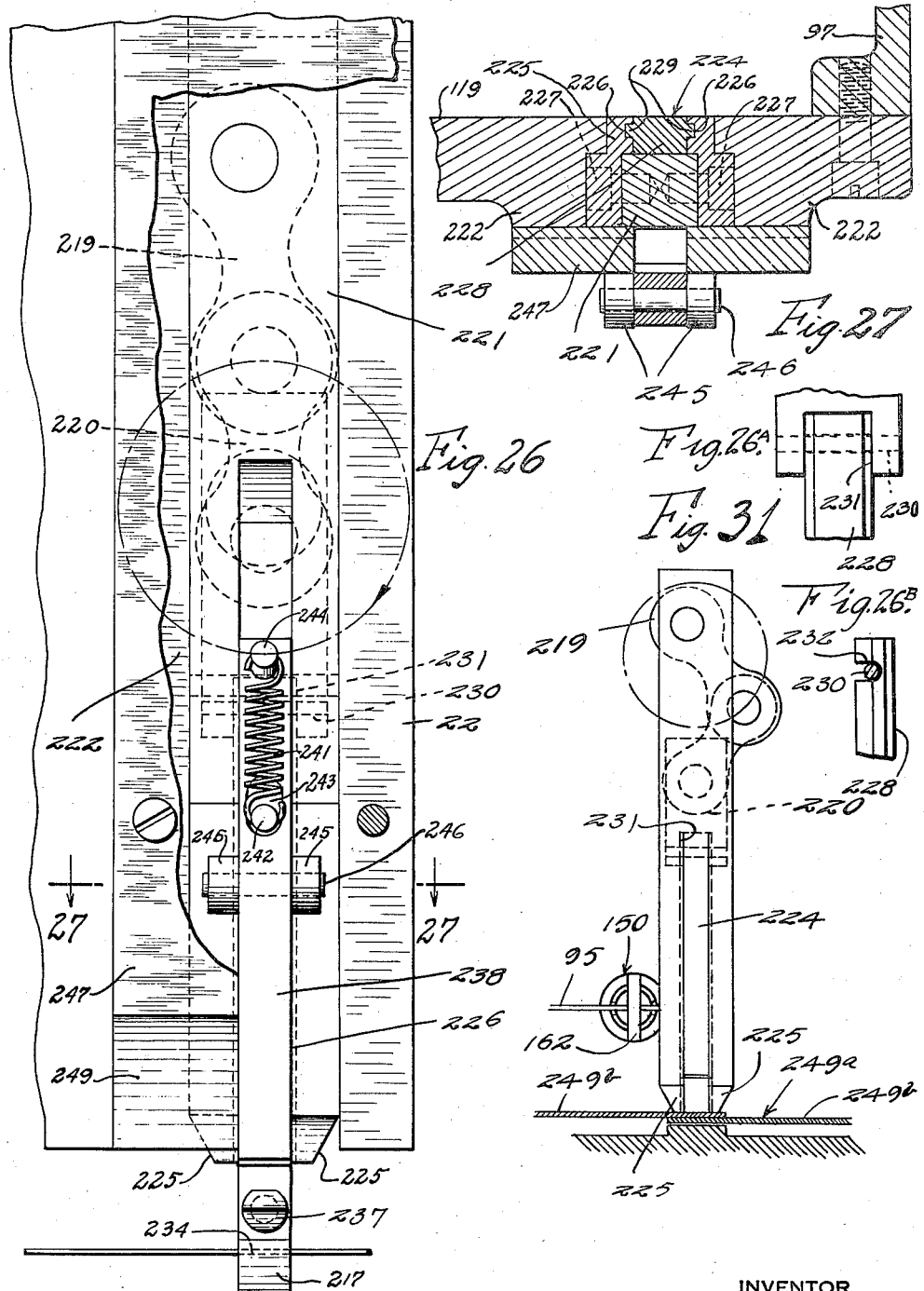

Dec. 31, 1940. R. E. ZERUNEITH 2,226,916
WIRE STITCHER
Filed May 11, 1939 19 Sheets-Sheet 11
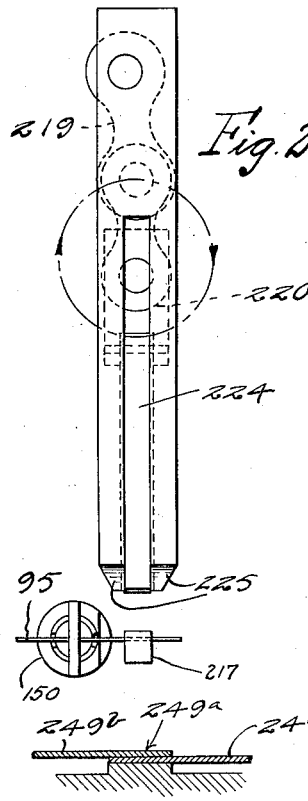
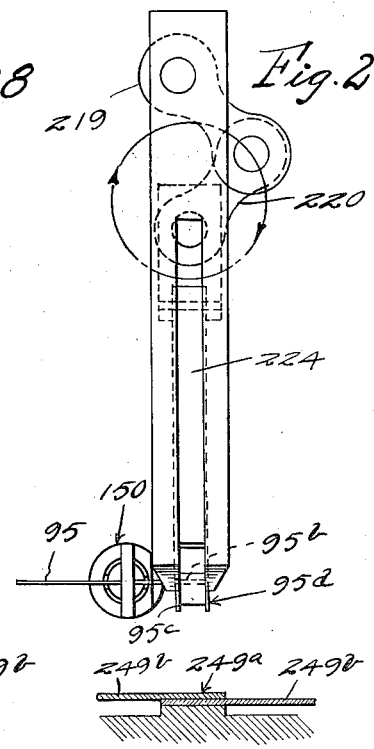
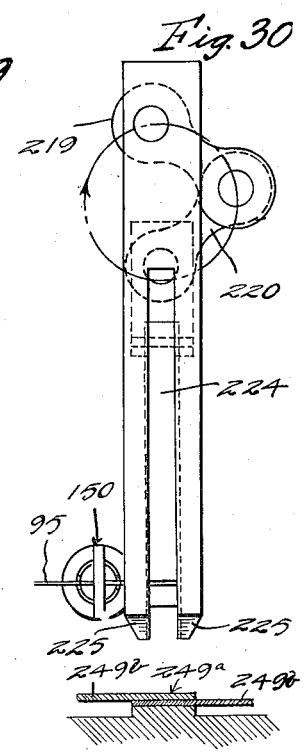
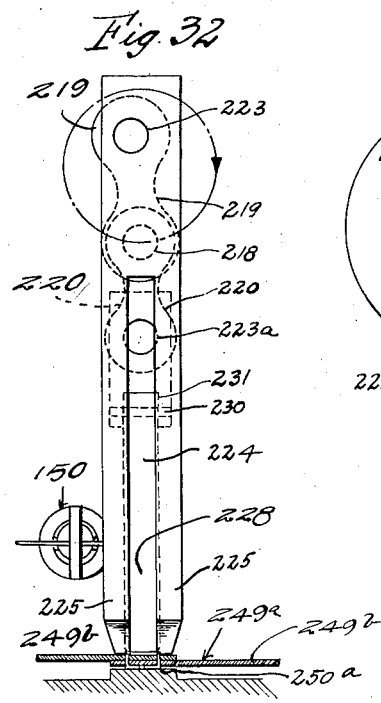
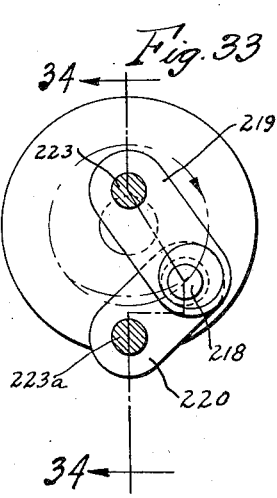
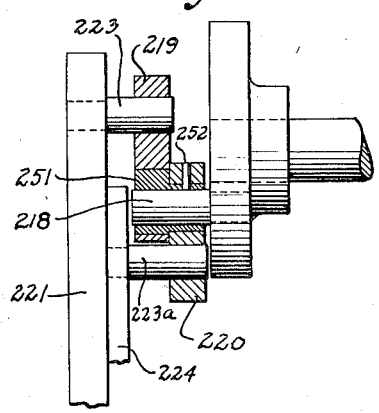
INVENTOR
R.E. Zeruneith
BY
Kimmel & Crowell ATTORNEYS

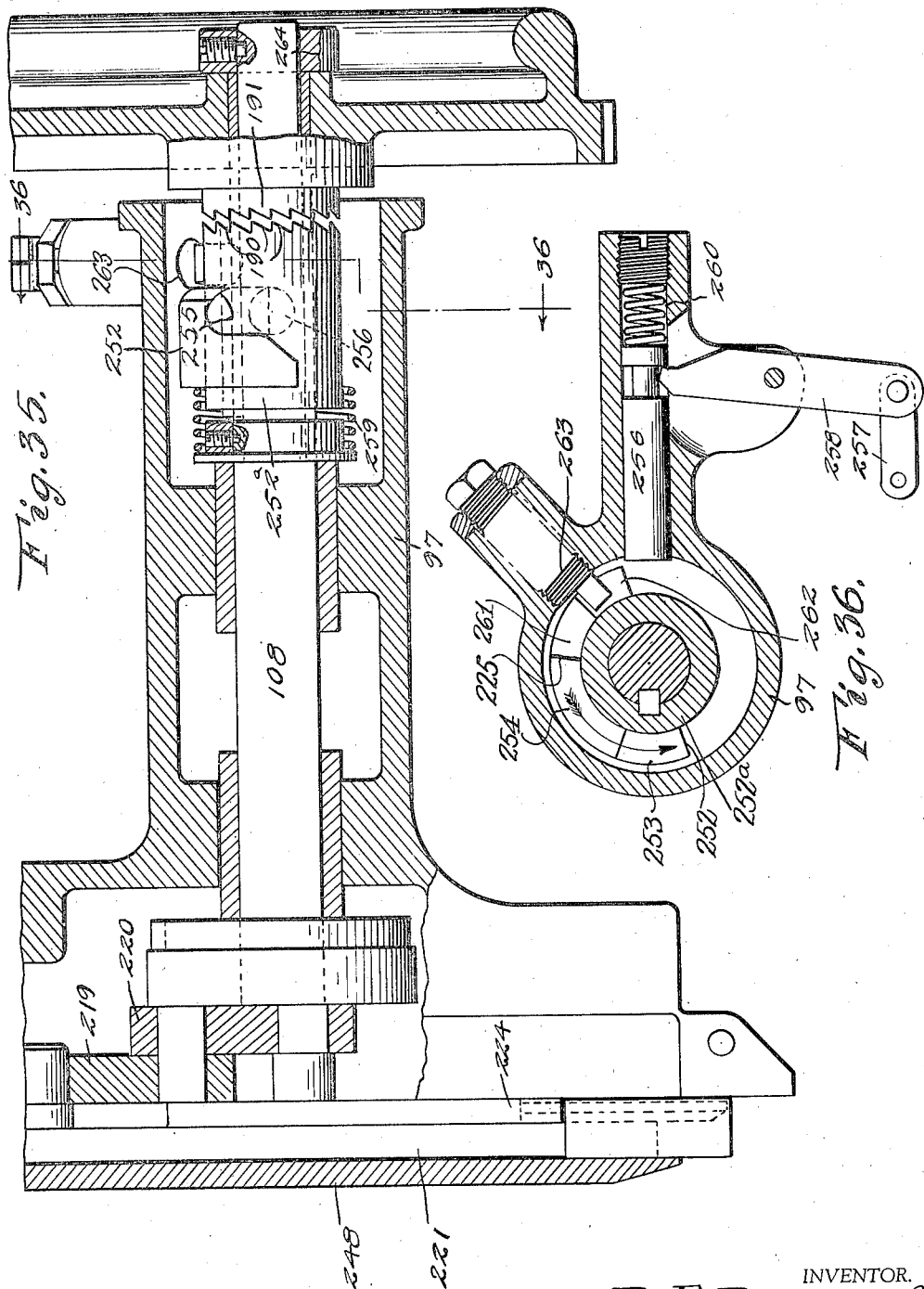

Dec. 31, 1940.  R. E. ZERUNEITH  2,226,916
WIRE STITCHER
Filed May 11, 1939  19 Sheets-Sheet 13
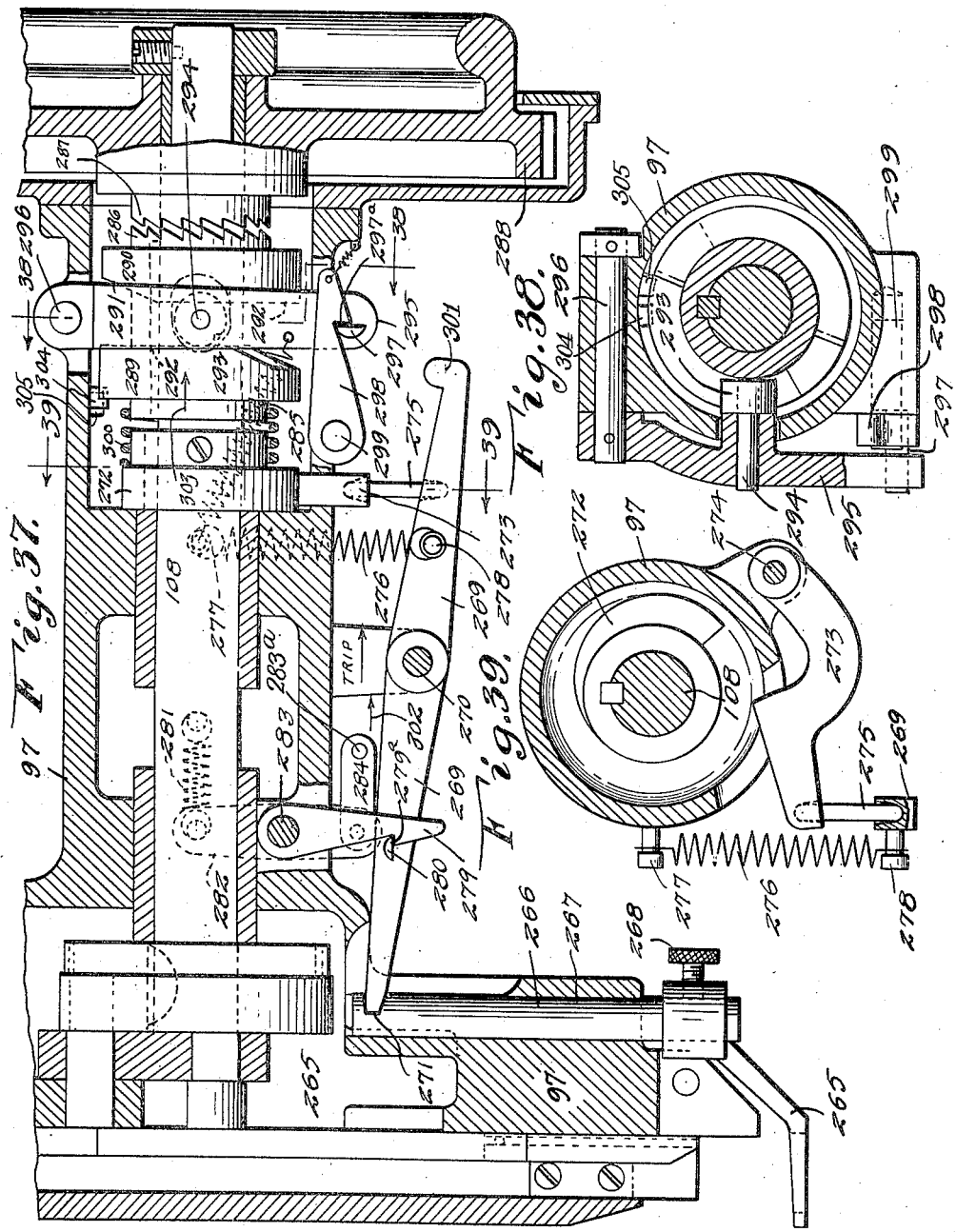
INVENTOR.
R.E. Zeruneith
BY
Kimmel & Crowell ATTORNEYS

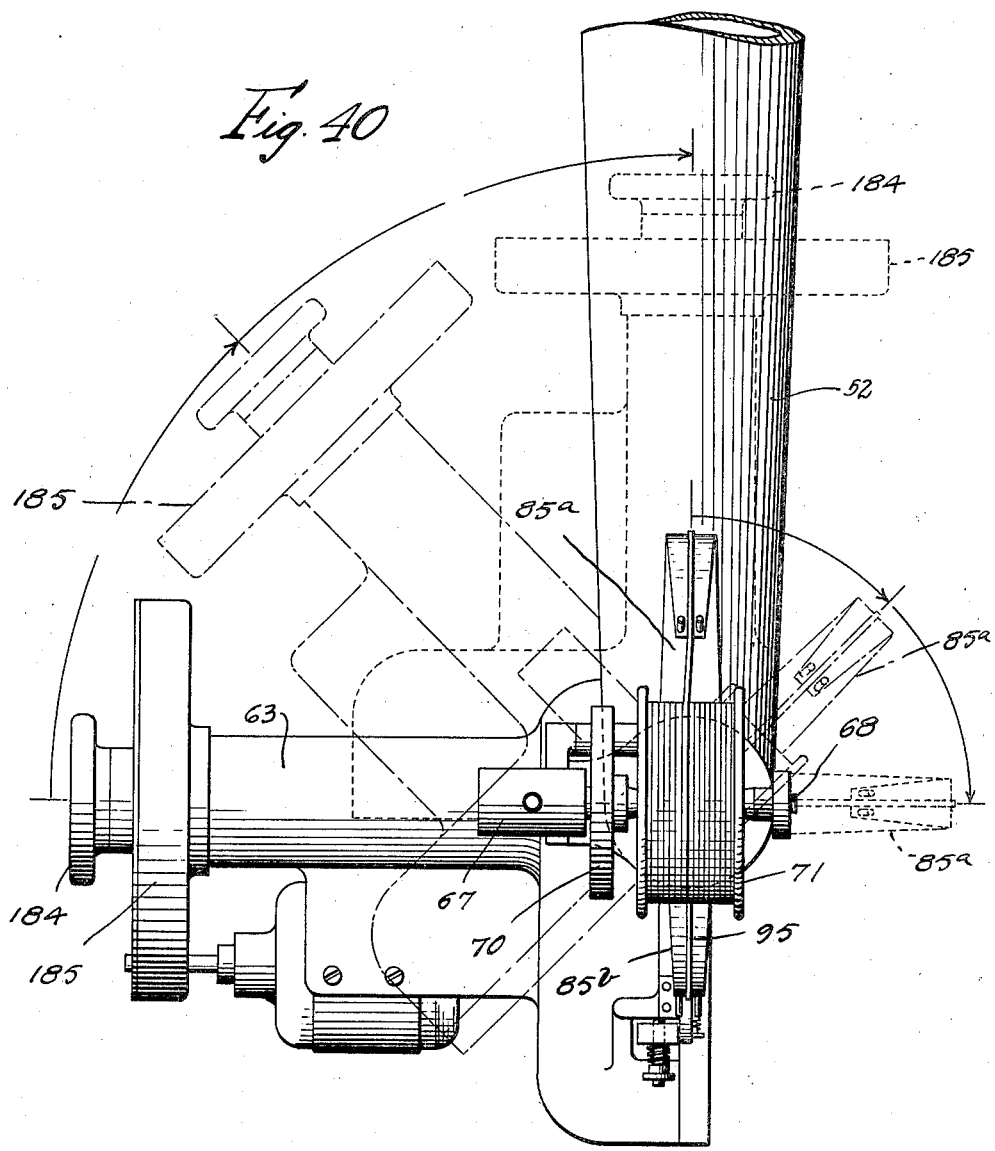

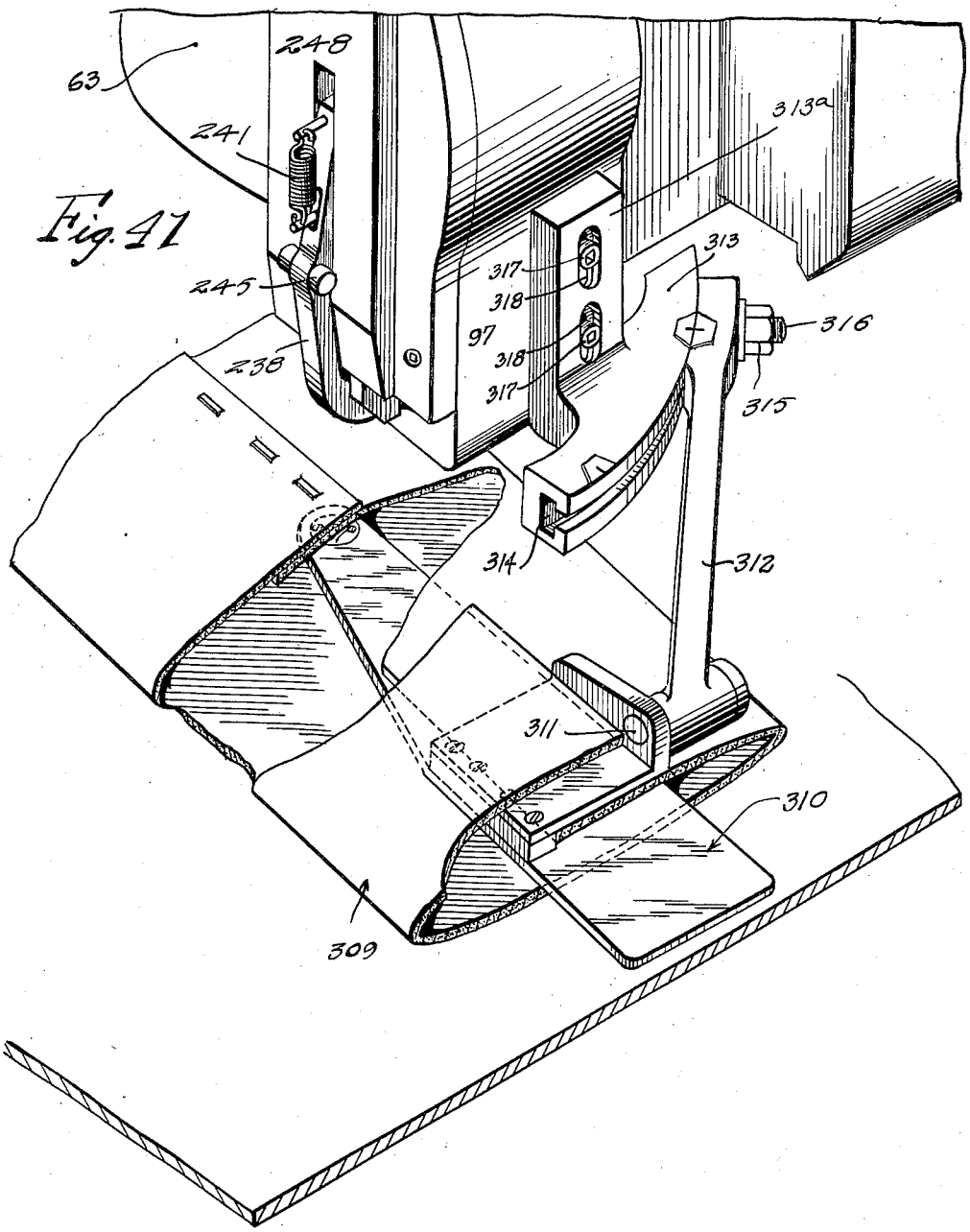

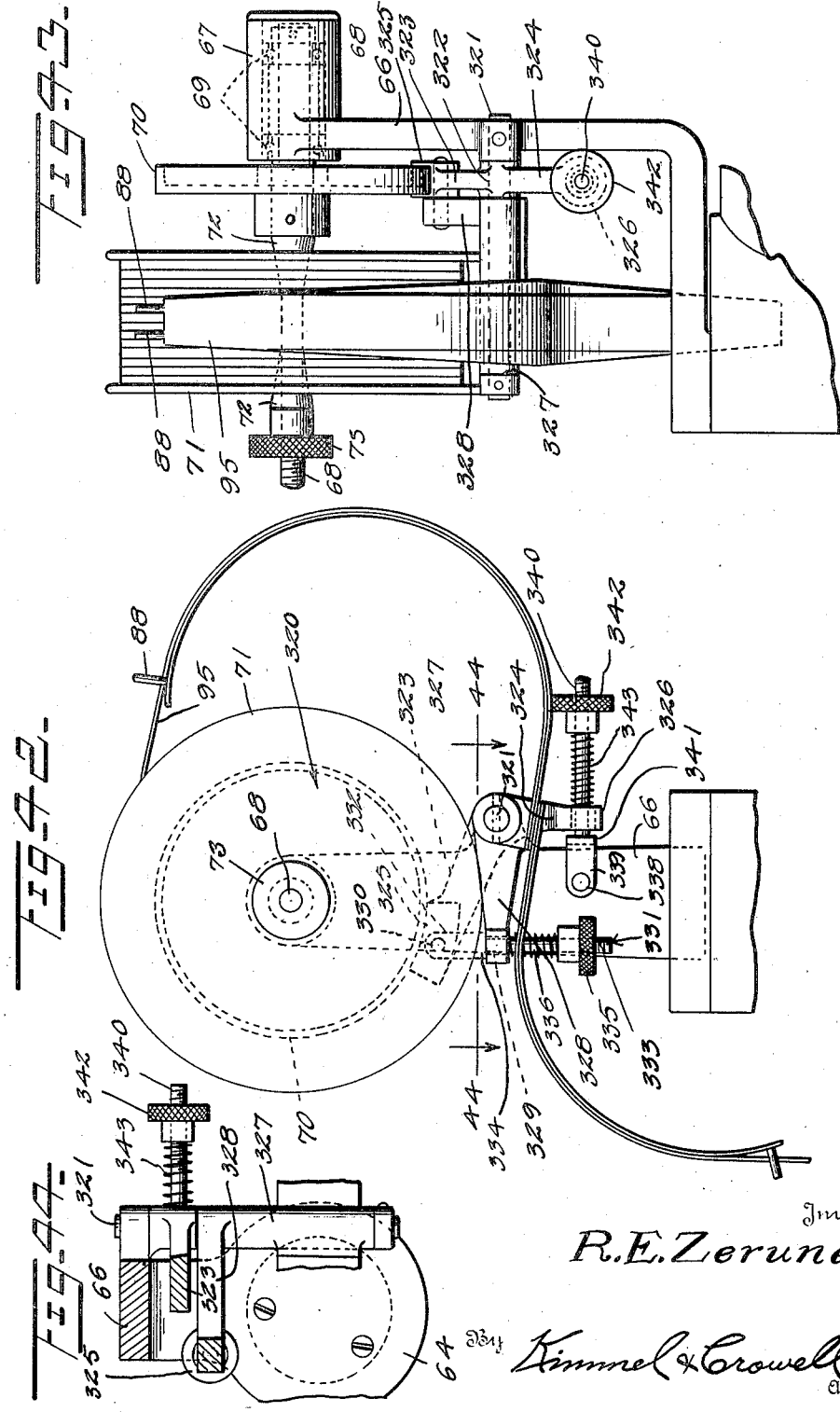

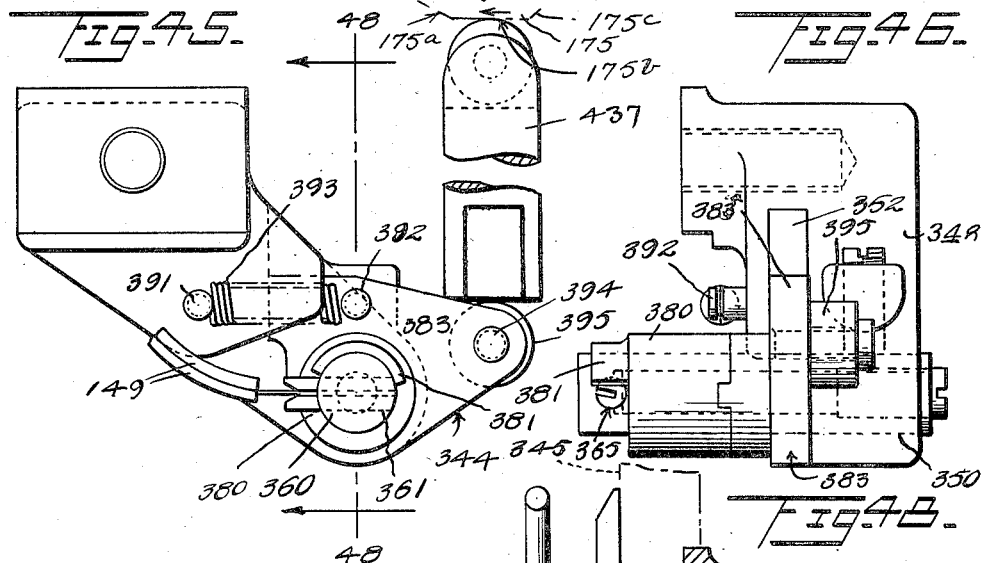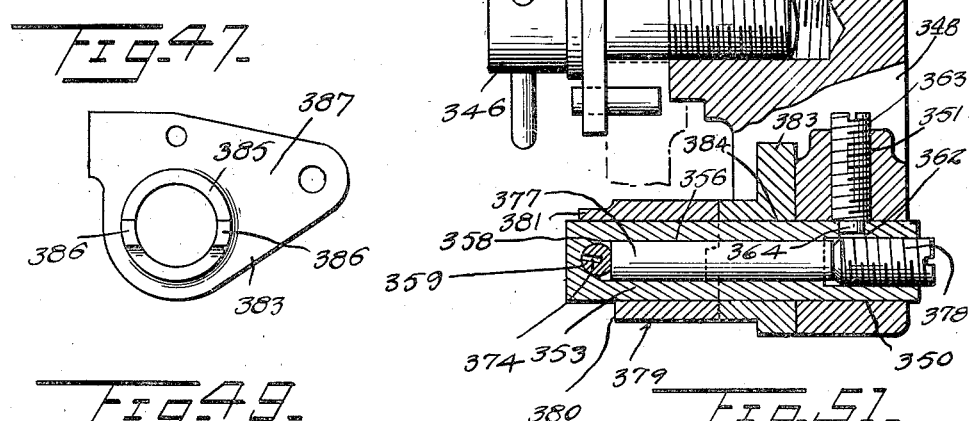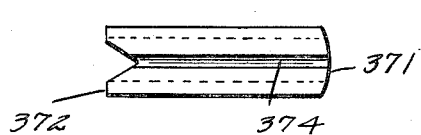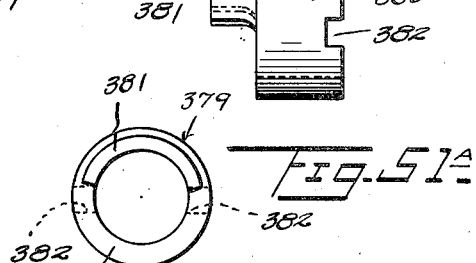

Dec. 31, 1940.   R. E. ZERUNEITH   2,226,916
WIRE STITCHER
Filed May 11, 1939   19 Sheets-Sheet 18

INVENTOR.
BY R. E. Zeruneith
Kimmel & Crowell ATTORNEYS.

Dec. 31, 1940.    R. E. ZERUNEITH    2,226,916
WIRE STITCHER
Filed May 11, 1939    19 Sheets-Sheet 19
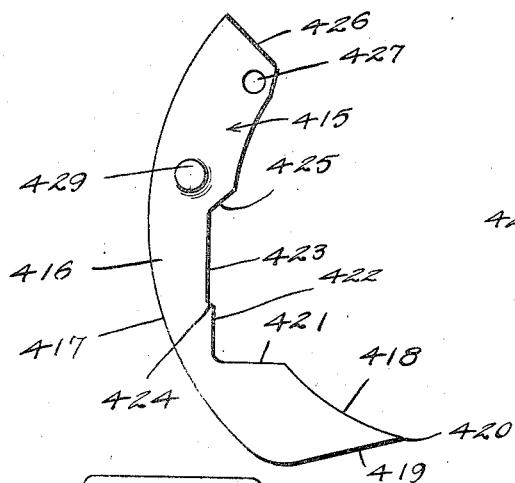
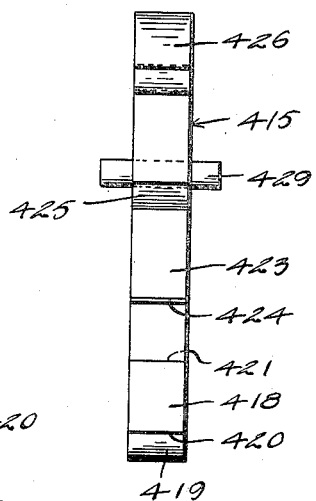
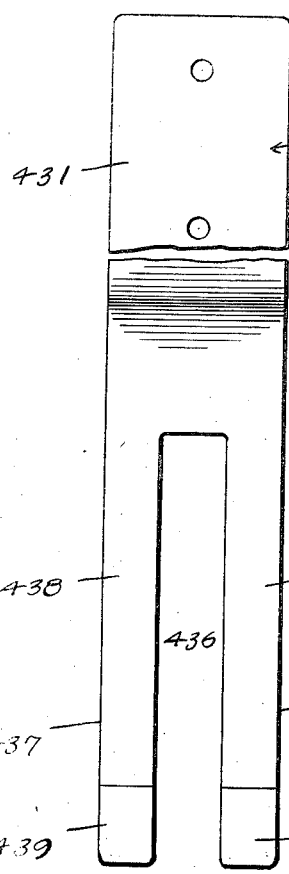
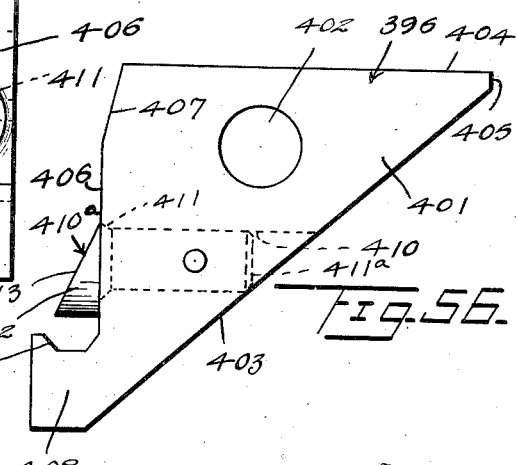
Inventor
R. E. Zeruneith
By Kimmel & Crowell
Attorneys Patented Dec. 31, 1940

2,226,916

UNITED STATES PATENT OFFICE 2,226,916

WIRE STITCHER

Rudolph E. Zeruneith, New York, N. Y.

Application May 11, 1939, Serial No. 273,105

21 Claims. (Cl. 1—2)

The present invention, in its broader aspects, relates to power-driven machinery in general, and it relates more particularly to automatic wire-stitching machines.

One of the objects of the present invention is to provide a safe and efficient wire-stitching machine which may be readily adapted for use in stitching any one of a wide variety of articles, and one which will perform satisfactorily at all times, which is sturdy and can withstand prolonged abuse, and which is yet producible at a relatively low cost.

Another object of the present invention is to provide in a manner as hereinafter set forth, a wire-stitching machine wherein the stitching head or unit may be readily turned or adjusted to any one of a plurality of positions, whereby the machine may be used for numerous applications which would otherwise require the provision of several separate stitching machines.

Another object of the invention is to provide a motor actuated wire-stitching machine having an angularly adjustable stitching-unit with means whereby the application of power to said adjustable stitching-unit is controlled from a remote point disassociated from said unit.

Another object of the invention is to provide as an element of the machine an improved and efficient arrangement for operatively unwinding, guiding and supplying wire, thread or the like, from a supply spool or reel in a controlled manner under a state of tension to prevent slack.

Another object of the invention is to provide, as an element of the machine, a new and improved cutting means for cutting the wire fed relative to a staple forming and driving means into pre-determined lengths.

Another object of the present invention is to provide, as an element of the machine, new and improved means for safeguarding the operator against accidental injury, such as commonly caused by inadvertently placing one's hands between relatively approaching power-driven machine parts or members.

A further object of the invention is to provide, in a manner as hereinafter set forth, a machine of the class referred to with a driven structure common to a stitching mechanism in the form of a staple forming and driving mechanism, a cutter mechanism and a wire feeding mechanism and electrically actuated means for controlling the connection of said structure to a prime mover.

Further objects of the invention are to provide, in a manner as hereinafter set forth, a machine of the class referred to which is comparatively simple in its construction and arrangement, strong, durable, compact, readily assembled, thoroughly efficient in its use, capable of being quickly repaired when occasion requires, and comparatively inexpensive to set up.

Embodying the objects aforesaid and others which may hereinafter appear, the invention consists of the novel construction, combination and arrangement of parts to be more specifically referred to and illustrated in the accompanying drawings, wherein are shown embodiments of the invention, but it is to be understood that changes, variations and modifications may be resorted to which fall within the scope of the invention as claimed.

For the purpose of illustrating the invention, there is shown in the accompanying drawings the elements of the machine which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings, wherein like reference characters indicate like parts:

Figure 1 is a front elevation of a wire-stitching machine, in accordance with this invention, having its adjustable stitching unit set to form stitches generally perpendicularly to the direction of the stitching arm, Figure 2 is a side elevation looking towards the left of the machine illustrated by Figure 1, Figure 3 is a side elevation looking towards the right of the machine illustrated by Figure 1, Figure 4 is an exploded view, in perspective, of the adjustable stitching head or unit and showing how the latter may be supported by an over-hanging frame arm of the machine, Figure 5 is a front elevation, upon an enlarged scale, of the tensioned wire or thread supporting, unwinding, guiding, supplying structure, Figure 6 is an elevation looking towards the right side of the structure shown by Figure 5, Figure 7 is a section on line 7—7 of Figure 6, looking in the direction of the arrows, Figure 8 is a schematic view, in perspective, of the gear train disposed within the stitching head or unit of the machine shown in Figures 1 to 4, inclusive, and which inter-connects the driving motor and the driven parts of said head or unit.

Figure 9 is a front elevation, upon an enlarged scale, of the wire feed mechanism for the wire-stitching mechanism of the machine shown in Figures 1 to 4, inclusive.

Figure 10 is a rear elevation of the mechanism shown in Figure 9,

Figure 20:
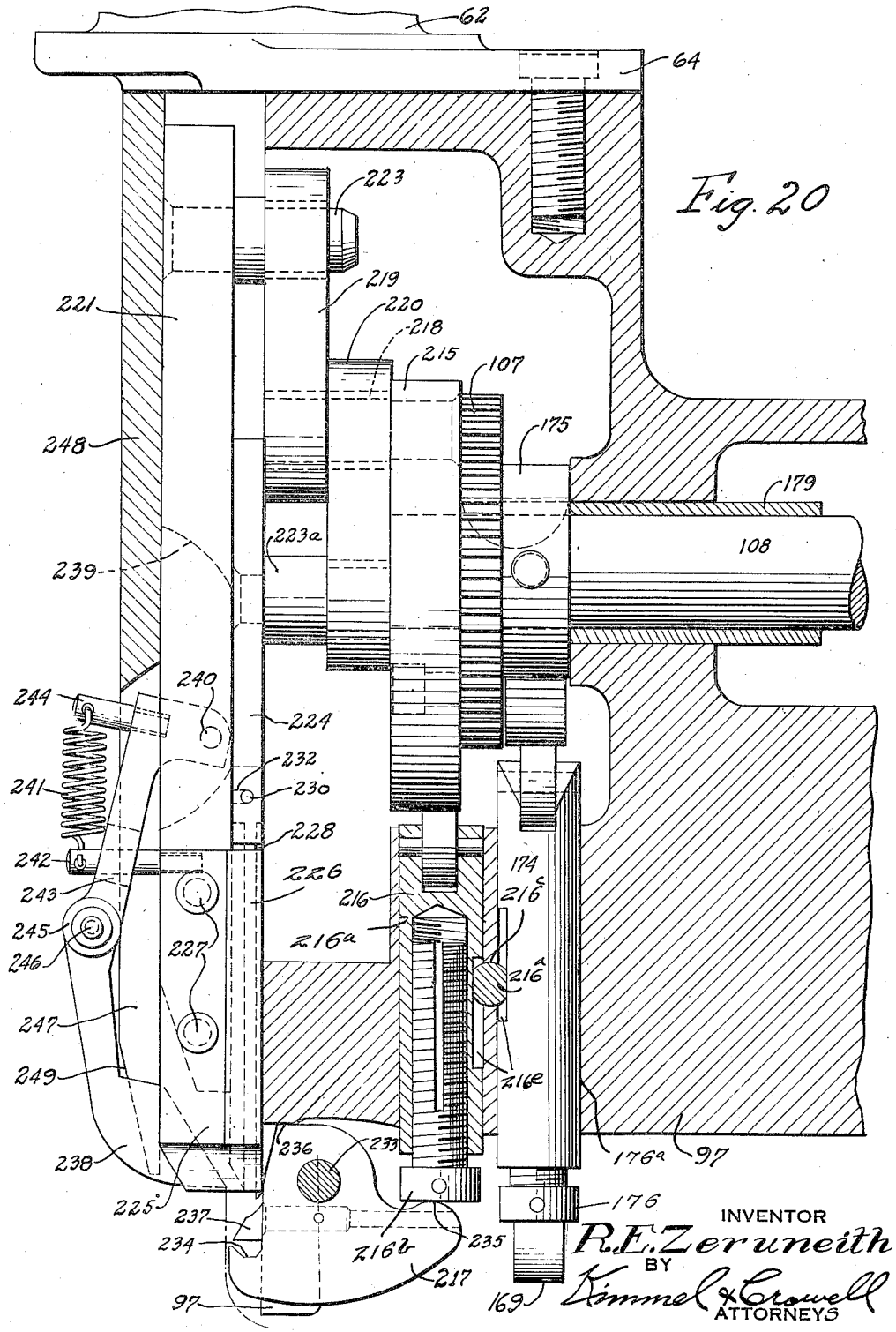

Figure 11 is an enlarged sectional view taken on broken line 11, 11 of Figure 9, looking in the direction of the arrows, Figure 12 is an enlarged sectional view taken on line 12, 12 of Figure 9, looking in the direction of the arrows, Figure 13 is a front elevation, upon an enlarged scale, of a wire-check or stop device positioned (Figure 4) immediately above the wire-feed mechanism and which acts prevents the return movement of the wire, Figure 14 is a front elevation, upon an enlarged scale, of the wire-cutting mechanism of the machine shown in Figures 1 to 4 inclusive, Figure 15 is a front elevation, upon an enlarged scale, of the wire-cutting mechanism and actuating means for the latter as the same appear when disassociated from the other elements illustrated in Figure 14, Figure 16 is a sectional view on line 16—16 of Figure 15, looking in the direction of the arrows, Figure 17 is a sectional view taken on line 17—17 of Figure 16, looking in the direction of the arrows, Figure 18 is an exploded view in perspective, of the heart of the cutting-unit shown in Figures 15 and 16, Figure 19 is a longitudinal sectional view upon an enlarged scale taken through the rear half of the stitching head or unit on line 19, 19 of Figure 4, Figure 20 is a longitudinal sectional view upon an enlarged scale taken through the front half of the stitching head or unit on line 20—20 of Figure 4, Figure 21 is a side elevation of the electrically-controlled clutch mechanism illustrated in Figure 19, when such mechanism appears exposed to view, Figure 22 is a transverse section of the clutching mechanism taken on line 22—22 of Figure 21, looking in the direction of the arrows, Figure 23 is a view similar to Figure 21, but with the clutch throw-out plunger retracted and the clutch accordingly engaged, Figure 24 is a fragmentary view in side elevation of the clutching mechanism showing the clutch throw-out plunger, when released, encountered by the cam-surface on the axially slidable revoluble clutch sleeve, thereby causing the latter to be slid to the left and disengage the clutch, Figure 25 is an elevation looking towards the inner face of the engageable toothed clutch member, as viewed from line 25—25 of Figure 23, looking in the direction of the arrows, Figure 26 is a front elevation, upon an enlarged scale, of the staple-forming and staple-driving mechanism illustrated in Figure 20, with portions broken away to reveal underlying parts, Figures 26A and 26B are fragmentary details in rear and side elevation of the upper end of the pick-up finger, Figure 27 is a sectional view taken on line 27—27 of Figure 26, looking in the direction of the arrows, Figure 28 is a diagrammatic view showing the relative positions of the reciprocable staple-forming and staple-driving members at the beginning of their operative down-stroke, Figure 29 is a view similar to Figure 28 showing the relative positions of the descending staple-forming and staple-driving members, arrested immediately after the wire has been cut and bent to form the staple, Figure 30 is a view similar to Figure 28 showing the relative positions of the descending staple-forming and staple-driving members, arrested immediately after the staple-driving member has encountered the now inoperative pivotable anvil and has swung it back out of the way, Figure 31 is a view similar to Figure 28 showing the relative positions of the staple-forming and staple-driving members arrested after the staple-forming member has preliminarily compressed the work to be stitched and just as the staple is about to be driven therethrough, Figure 32 is a view similar to Figure 28 showing the relative positions of the staple-forming and staple-driving members arrested immediately after the staple legs have been driven completely through the work and clinched on the underside of the latter, Figure 33 is a front elevation partly in section of an alternative or modified form of eccentric mechanism employed between the driving crank and the connecting links driven thereby for the purpose of increasing the dwell period of the reciprocable staple-forming members when they compress the work at the end of their down-stroke, Figure 34 is a sectional view taken on the broken line 34—34 of Figure 33, looking in the direction of the arrows, Figure 35 is a view similar to Figure 19, but showing the clutch provided with a safety arrangement comprising a modified clutch throw-out sleeve which coacts with an auxiliary throw-out pin to automatically disengage the clutch during a predetermined phase of each cycle, and during which phase the stitching mechanism, if unobstructed, continues of its own momentum until the clutch is automatically re-engaged.

Figure 52:
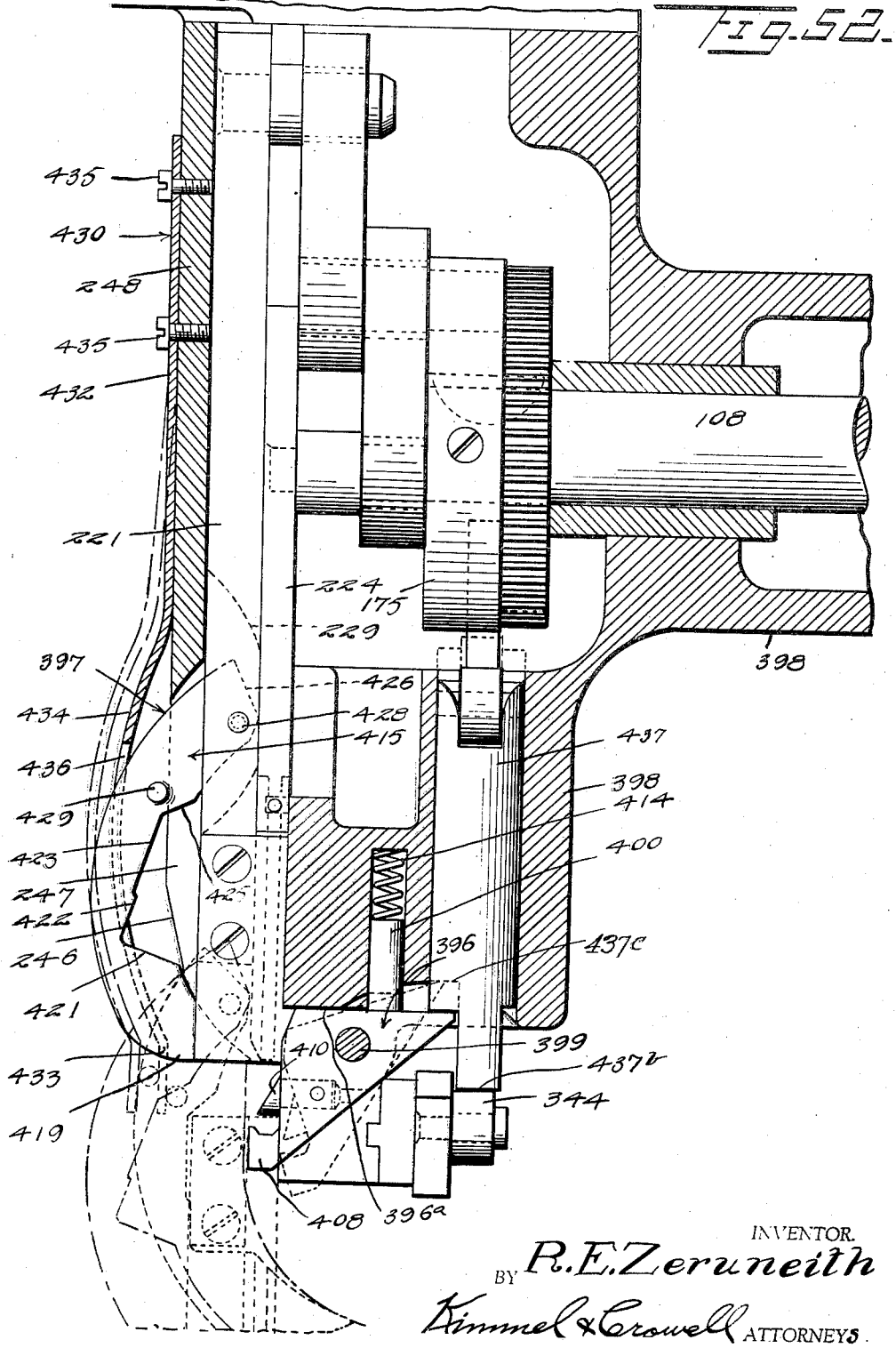

Figure 36 is a sectional view taken on line 36—36 of Figure 35, looking in the direction of the arrows, Figure 37 is a longitudinal sectional view taken through the stitching head of a modified form of wire-stitching machine, wherein a system of coacting levers and latches extending from the stitching area back to the clutch on the drive shaft, the engagement of the clutch is prevented when a foreign body is introduced into the stitching area, and whereby the clutch if already engaged will be disengaged thereby, Figure 38 is a sectional view taken on line 38—38 of Figure 37, looking in the direction of the arrows, Figure 39 is a sectional view taken on line 39—39 of Figure 37, looking in the direction of the arrows, Figure 40 is a plan view, upon an enlarged scale, of the stitching unit suspended from the end of the frame arm of the machine shown in Figures 1 to 3 inclusive, and shows the manner in which said unit may be adjustably swivelled or turned through varying angles, to vary the angle of the staple relative to the work and stitcher arm, Figure 41 is a fragmentary view in perspective, upon an enlarged scale, of the stitching portion of the machine provided with means whereby a stitching tongue used for stapling long tubular work may be rotatably adjusted relative to the stitching head or unit to permit staples angularly related to the seam line to be driven into the tubular work, Figures 42, 43 and 44 are respectively a front elevation, an elevation looking towards the right side of the structure shown by Figure 42 and a section on line 44—44, Figure 42, of a modified form of a tensioned wire or thread supporting, unwinding, guiding and supplying structure, Figure 45 is a fragmentary view of the machine in front elevation illustrating the adaptation therewith of a modified form of wire-cutter mechanism, Figure 46 is a side elevation of the modified form of wire-cutter mechanism, Figure 47 is a front elevation of the actuating member for the cutter element of the mechanism shown in Figures 45, 46, Figure 48 is a section on line 48—48 Figure 45, Figure 49 is a front elevation and Figure 50 an end view of the cutter block forming a part of the mechanism shown by Figure 45, Figure 51 is a side elevation and Figure 51A a front elevation of the cutter element of the mechanism shown by Figure 45, Figure 52 is a fragmentary view in side elevation and vertical section of the machine and illustrating the adaptation therewith of a modified form of anvil and a modified staple pick-up means and further showing the modified form of wire-cutter mechanism, Figure 53 is a side elevation of the staple pick-up finger or member forming a part of the modified form of pick-up means shown by Figure 52, Figure 54 is an elevation of the pick-up finger shown by Figure 53 looking towards the inner face edge thereof, Figure 55 is a front elevation, broken away, of the resilient urging spring for the pick-up finger shown by Figures 52, 53 and 54, Figure 56 is a side elevation of the modified form of anvil shown by Figure 52, and Figure 57 is a front elevation of the anvil shown by Figure 56.

The wire-stitching machine illustrated in the accompanying drawings preferably includes a relatively broad base 50 having an integral column 51 disposed eccentrically thereof, extending therefrom and terminating in an overhanging arm 52 constituting a hanger. The base 50 may be provided with a slightly raised platform 53 to which may be bolted or otherwise secured any desired accessory, as for instance, a clincher pole, a vertically adjustable table, or the like.

In Figures 1 to 3, inclusive, a vertically, adjustable, work-supporting stitcher-arm 54 has been illustrated which is to be operatively clamped against the column 51 by any suitable means and by way of example, such means is shown in comprising a pair of oppositely disposed clamping bolts 55, 55. A vertical tongue or rib 56 formed integrally with the column 51 slidably projects into a corresponding vertical groove 57 formed in the inner end of the stitcher arm 54, and the height of this vertically adjustable stitcher-arm 54 may be varied by means of an adjustment screw 58 supported from column 51. If desired, a series of graduations may be applied along the upper edge of the stitcher-arm 54 to indicate the distance between the face of a slidable stop 59 against which the edge of the work may be pushed, and the center of the stitch formed at the end of the stitcher-arm 54.

The slidable stop 59 may be provided with a manually operable set-screw 60 for releasably fixing its position along the stitcher-arm 54.

As more particularly shown in Figure 4, the outer end of the overhanging arm 52 is provided with a vertical sleeve or bearing 61, which rotatably receives a vertical trunnion 62 forming an element of the head or unit 63 of the machine.

The pivotally supported and angularly adjustable head or unit 63 not only includes the trunnion 62, but it also includes a supporting, supplying, unwinding, guiding and tensioning structure for wire or a thread, an anvil, a wire or thread stitching mechanism, a normally inactive main driving structure including a shiftable spring controlled clutching element, operating means for said main driving structure including an electric motor and a fixed clutching element for coaction with said shiftable element, a controlling means for said shiftable clutching element, a wire or thread cutting mechanism, a wire or thread feeding mechanism, a wire or thread stop, operative means for said stitching mechanism driven from said main driving structure, operating means for the cutter mechanism driven from said main driving structure, operating means for said feeding mechanism driven from said main driving structure, a staple support, and an electrically operated shifting means for said controlling means, the said structures, anvil, stop, mechanisms and means will be more specifically referred to, but they bodily move in unison when the head or unit is adjusted relative to the arm 52.

A trunnion-retaining plate 64 is bolted or otherwise secured onto the top of the trunnion 62, thereby to suspend the head or unit 63 at the outer end of the arm 52. An eccentric clamping bolt 65, which projects transversely through the outer end of the supporting arm 52 into the sleeve 61 is disposed at or tangent to the trunnion 62. The bolt 65 is for binding against and to prevent rotation of said trunnion when operatively turned to move against the trunnion, thereby providing readily releasable means for securing the head or unit 63 at any selected angle relative to the arm 52.

Referring more particularly to Figures 5 to 7 inclusive, the combined wire or thread supporting, unwinding, guiding and supplying structure 66ª includes a vertical spool-supporting bracket 66 integral with and offset with respect to the retaining plate 64. The bracket 66 is of angle form and terminates at its upper end in a sleeve or bearing housing 67, within which is journalled a freely rotatable spindle 68 of greater length than and extended from one end of the sleeve. This spindle 68, within the sleeve 67, extends through a pair of spaced anti-friction bearings 69, 69, and that portion thereof projecting exteriorly of the sleeve 67 has keyed or otherwise fastened thereto a brake drum 70. A wire or thread supply spool or reel 71 is slipped over the outer free end of the spindle 68 and then centrally held thereon by the relatively approachable tapered seats 72, 72, one of which is formed integrally with the brake drum 70, and the other one of which is formed by the end terminal portion of a rotatable clamping nut 73 which threadedly engages the threaded free end of the spindle 68.

A bell-crank lever 75, is journalled on a fixed shaft 76 extending laterally from the vertical arm of bracket 66. The curved upper end 74 of lever 75 is pressed against the periphery of the brake-drum 70 in the manner of a brake-shoe due to a tension spring 77, whose fixed end is hooked through a pin 78 extending from the bracket 66 and whose movable end is hooked through a pin 79 extending from that end of the bell-crank lever 75 opposite its brake shoe forming end. The tension spring 77 preferably normally exerts a sufficient pull on the bell-crank lever 75 to cause the brake shoe end 74 thereof to bear against the brake-drum 70 with sufficient pressure to prevent rotation of the spindle 68, and accordingly the spool or reel 71.

A sleeve 80 is journalled on the fixed shaft 76 immediately adjacent the hub of the bell-crank lever 75, and is prevented from sliding off said shaft by a retaining collar 81. One end of the sleeve 80 has depending therefrom a pin 82 which is resiliently drawn to a pin 84, extending from the brake-shoe end 74 of the bell-crank lever 75, by means of a brake-pressure-modifying tension spring 83. The movement of pin 82 in the direction of the pull exerted thereon by the tension spring 83 is limited by a stop 90 extending laterally from the vertical arm of the bracket 66.

As more particularly illustrated in Figure 5, a counterclockwise movement of the sleeve 80 and its associated pin 82 will increase the tension of the spring 83, which accordingly will decrease the braking pressure between the brake-shoe 74 and the brake-drum 70 created by the coiled brake spring 77.

The overlapped ends of a pair of oppositely disposed flexible wire-guiding leaf springs 85—a and 85—b are arranged below and secured with the underside of the sleeve 80 in spaced relation. Arranged between said ends are spaced spacer plates 86, 86 which are held therebetween by the screws 89, 89, in a manner to provide a central channel 87 through which the wire travels from off of the outer face of the spring 85—a onto the upper face of spring 85—b, when being unwound from the spool 71.

A pair of spaced parallel wire-guiding pins 88, 88 are disposed at the leading edge of the upper leaf spring 85—a and at the trailing edge of the lower leaf spring 85—b, so as to prevent the wire from slipping off either of these springs in transit thereover. If desired, the number of pairs of spaced wire-guiding pins used may be increased to suit the particular requirements and curvature of the leaf springs.

The wire strand is intermittently unwound from the spool 71 by means of the wire feeding mechanism 88ª which includes a pair of continuously rotating feed rolls 91 and 92, provided over a portion of their circumferences with peripheral arcuate projections constituting wire-gripping portions 93 and 94, respectively, all as shown in Figures 9 to 12 inclusive. As the feed rolls 91 and 92 rotate, the projecting wire-gripping portions 93 and 94 intermittently or periodically grip the wire strand 95 on opposite sides and pull it downwardly to an extent determined by the relative angular dispositions of the wire-gripping portions 93 and 94, respectively. This feeding operation occurs once for each complete revolution of the feed rolls 91 and 92, and accordingly the wire strand 95 is intermittently pulled downwardly and advanced.

A wire check or stop 95ª is preferably operatively positioned intermediate the bottom leaf spring 85—b and the feed rolls 91, 92, for the purpose of preventing return or upward movement of the strand 95. This wire check 95ª, as illustrated in Figures 5 and 13, may include a wire-guiding plate 96 affixed to a support 96ª on a head casting or housing 97 which houses the wire-stitching mechanism 97ª (to be described in greater detail hereinafter), a spring-controlled pawl 98 pivotable about a fulcrum screw 99 on support 96ª, and a tension spring 100 having its stationary end hooked through a fixed pin 101 on support 96ª, and having its opposite or movable end hooked through a pin 102 extending from the pawl 98.

In actual operation, the wire-gripping feed-roll portions 93, 94 grip the wire strand 95 and pull it downwardly. Since the brake-shoe 74 bears with full force against the spool brake-drum 70, the spool 71 is locked and cannot readily rotate or unwind. Accordingly, at least part of the wire fed downwardly by the feed-rolls at each revolution is drawn from the portion of the wire strand 95 contacted by the leaf springs 85—a and 85—b. Thus, as the strand 95 is pulled downwardly, the springs flex inwardly (i. e. in a counter-clockwise direction) due to the shortening of the superimposed wire strand. The resultant increased torque exerted on the overlapped ends of these leaf springs 85—a, 85—b rotates the sleeve 80 and its associated pin 82 in a counter-clockwise direction, thereby increasing the downward pull exerted by the brake-pressure-modifying spring 83 on the brake-shoe 74 and therefore tending to lessen or decrease the braking pressure. This decrease of braking pressure, accompanied by the inherent tendency of the flexed leaf springs to resume their normal position, and further accompanied by the inherent tendency of the resilient wire strand to unwind from the reel 71, results in turning said reel by an amount sufficient to pay out just as much wire as was drawn down by the feed rolls 91 and 92.

The amount of wire paid out from the spool 71 for each revolution of the feed rolls is directly proportional to the length of wire advanced by said feed rolls, since the latter determines the degree of rotation of the sleeve 80 and its associated pin 82, and therefore the decrease in braking pressure between brake-shoe 74 and brake-drum 70.

By means of the hereinabove described arrangement, the downward pull exerted on the wire strand 95 results in a lessening of the braking pressure to an extent and over a period, corresponding to the extent of said downward pull, thereby permitting the unwinding of just enough wire to meet the machine's requirements, and no more. Thus, the hereinabove described arrangement permits the spool to unwind at a rate determined solely by the requirements of the machine with which the spool is associated, and will not break the wire, nor permit it to run wild and become tangled.

While this frictioned spool-holding arrangement has been illustrated operatively juxtaposed with a wire-stitching machine, it is to be expressly understood that it may be used in conjunction with the unwinding of textile, paper and other webs, threads, ribbons and the like, and it may be associated with numerous other machines wherein a controlled unwinding of material from a spool or reel is desired, and this irrespective of whether the material is to be unwound continuously or intermittently.

If desired, adjustable means may be provided for varying the tensions exerted by some or all of the springs, whereby adjustments may be made to meet the various requirements encountered in actual operation.

As more particularly illustrated in Figures 8 to 10, inclusive, the feed rolls 91 and 92 are secured to a pair of spaced rotatable shafts 103 and 104, respectively, to the back ends of which are fixed a pair of meshing spur gears 105 and 106 driven by the gear 107 mounted on a drive shaft 108. This latter drive shaft 108 is in turn driven by a rearwardly disposed gear 109, which meshes with, and is driven by, a motor pinion gear 110 mounted on the shaft of an electric motor 111.

The feed-roll 92 is preferably non-rotatable relative to its driving gear 106. Thus, as illustrated in Figure 12, both the feed-roll 92 and its driving gear 106 are each keyed to their common shaft 104 by keys 112 and 113, respectively. An annular ring 114, a portion of whose circumference is raised to provide the peripheral wire-gripping projection 94, may be securely seated in an annular seat 115 on the feed-roll 92 by means of the screws 116. The feed-roll shaft 104 may be rotatably supported within an aperture 117 extending through a fixed supporting member 118, which member is secured to the rear side of the front cover plate 119 by the screws 120, by means of a pair of spaced tapered roller bearings 121, 121, which may be held apart by the spacing sleeve 122. A set-screw 123 may bear against this sleeve 122 to fix it within the aperture 117. An adjustment nut 124 threadedly engages the end of shaft 104, and may be locked thereon by a lock nut 125 and associated lock washer 126. The roller bearings 121, 121 may be lubricated through a lubricant-receiving nipple or fitting 127 which serves to conduct lubricant injected thereinto through an aperture 128 in the spacing sleeve 122, from whence it may reach the roller-bearings.

Referring more particularly to Figure 11, the feed-roll 91 preferably includes a rotatably adjustable annular ring 129, a portion of whose circumference is raised to provide the peripheral wire-gripping projection 93. The means associated with the ring 129 whereby the angular disposition of its wire-gripping projection 93 may be readily adjusted relative to the co-acting nonadjustable wire-gripping portion 94 on the adjacent feed-roll 92 includes a cooperating seat-providing ring 130 fixed to the shaft 103 by a pin 133 and having a tapered rim 131, bearing against the correspondingly tapered surface 132 on the ring 129. The ring 129 is operatively clamped against the seating ring 130 by a nut 134, which threadedly engages the outer end of the shaft 103 and bears against a clamping washer 135 angularly fixed relative to the shaft 103 by pins 136, 136 slidably disposed within corresponding apertures in the ring 130. If desired, the outer surface of the clamping washer 135 may bear graduations cooperating with a marking on the rotatably adjustable ring 129 to indicate the angular relation of the ring 129 relative to its supporting shaft 103 and therefore to the adjacent feed-roll 92 which is propelled in timed relation to said shaft 103.

The feed-roll gear 105 is keyed to the shaft 103 by a key 137. This shaft 103 is rotatably supported in an aperture 138, which extends through pivotally adjustable supporting member 139 pivoted relative to the front cover plate 119 by the fulcrum pin 140, by means of a pair of spaced roller bearings 121—a, 121—a, held apart by a spacing sleeve 122—a. A set-screw 123—a fixes the sleeve 122—a within the aperture 138. An adjustment nut 124—a threadedly engages the end of the shaft 103, and may be locked thereon by a lock nut 125—a and associated lock washer 126—a.

Means are preferably provided for adjusting the pressure exerted by the wire-gripping projections 93 and 94 on the wire strand 95. The spacing between the feed-roll shafts 103 and 104 may be varied by pivoting the adjustable supporting member 139, thereby translating the feed-roll 91. The extent to which the feed-roll 91 may approach the feed-roll 92 is limited by means of a stop screw 141 which threadedly engages a projection 142 on the supporting member 139 and whose tip bears against the relatively fixed head-casting 97. A lock nut 143 may be provided to lock the screw 141 in any desired position. The pressure between the wire-gripping projections 93 and 94 may be varied by means of a pressure-adjustment nut 144 which threadedly engages a threaded stem 145 projecting from the head casting 97 and which bears against a compression spring 146 interposed between the top projection 142 of the supporting member 139 and said nut. By means of the foregoing, the space between the wire-gripping projections may be varied to conform with the size of the wire or thread being fed, and the force with which the feed-rolls grip the wire may be varied at will, by merely advancing or retracting the pressure-adjustment nut 144 on its stem 145.

It will be noted that the front cover plate opening 147 through which the feed-roll 91 projects is made sufficiently large to permit said roll to be adjusted between its limits without contacting the front cover plate 119.

Assuming the wire-stitching machine to be operated continuously rather than intermittently, the meshing gears 105 and 106 rotate continuously, driving the feed-rolls 91 and 92 in their respective opposite directions at a constant speed.

The initial seizure and advance of the wire-strand 95 by the wire-gripping projections 93 and 94 is determined by the leading edge of the projection 93, and since this projection 93 is rotatably adjustable relative to the projection 94, the point at which the wire strand is initially engaged and advanced is adjustable, and may be readily advanced or set back. This point of initial seizure of the wire strand 95 is, however, independent of the release point, that is, the point at which the wire-gripping projections 93 and 94 disengage the strand to end the advance of the wire, for said release point is determined solely by the trailing edge of the non-rotatably-adjustable projection 94. The co-operating portions of the peripheral projections 93 and 94 may thus be increased or decreased in length, thereby increasing or decreasing the amount of wire fed at each complete revolution of the feed-rolls.

A pair of separable wire-guiding strips 148, 148 having at least one of their meeting surfaces suitably grooved or channelled to form a passageway through which the wire strand 95 may travel, are preferably detachably affixed to the front cover plate 119, and operatively guide the wire up to the feed-rolls, and a second set of suitably curved similar guiding strips 149, 149 may be detachably affixed to the front cover plate and may guide the wire strand from said feed-rolls into the cutter unit or mechanism. These strips 148 or 149 periodically may be readily removed, their grooves or channels exposed and easily cleaned, and the strips then replaced, insuring satisfactory performance at all times.

The cutter mechanism or unit, Figures 14 to 18 inclusive, indicated generally by the numeral 150, includes a sleeve 151 supported by a bracket 152 which is slidably mounted on the lower portion of the housing 97. This cutter-supporting bracket 152 is preferably slidably mounted on the housing 97 in any suitable manner. Thus, in the particular embodiment illustrated in the accompanying drawings this bracket is provided with a horizontal groove 153 slidable along a guide-rib 154 preferably formed integrally with the housing 97. A clamping screw 155, which is screwed into a screw-threaded aperture 155ª in the cutter-supporting bracket 152, extends through an elongated horizontal slot 156 formed in the housing 97, and when tightly screwed in, serves to clamp the cutter unit 150 in operative position (Figure 4) relative to the immediately adjacent staple-forming mechanism 97ª.

A pivoted pointer 157, which pivots about a fulcrum pin 158 extending from the head casting or housing 97 and through an end slot 159 in the pointer 157, cooperates with a graduated scale disposed on the face of the housing 97 to indicate the size of the staples formed, which depends on the length wire cut, in turn dependent on the distance of the cutting edge from the staple-forming mechanism. In actual practice, each time the length of wire fed by the feed rolls per revolution is varied, the position of the cutter unit 150 is preferably also varied in conformance therewith, so that the staple legs will be of equal length.

The cutter itself is cylindrical in form, and includes a relatively stationary cylindrical cutting block 160, which is transversely slit at one end, as at 161 to provide a path therethrough for the wire strand 95, and which is held against rotation by a vertical locking bar 162 which enters within a vertical slot 163 formed at the forward end of the cutting block 160 and which is fixedly secured to the end of the sleeve 151 by the screws 164, 164. The locking bar 162 not only serves to restrain the cutting block 160 against rotational movement, but also prevents the wire strand 95 from slipping sidewise out of the slit 161 once it has entered said slit.

The cutter includes a tubular cutting member 165, bearing a preferably axial cutting edge 166, is rotatably snugly superposed over the exterior of the fixed cylindrical cutting block 160, and will, when partially rotated, sever the wire strand 95 at a point co-incident with the right hand edge of the cutting block 160. The end of the tubular cutter 165 is preferably provided with a plurality of clearance notches 167, 167 so disposed as to permit the cutter to be operatively turned or oscillated through the requisite cutting angle without conflicting with the fixed vertical bar 162 and the portion of wire strand 95 at the inlet end of the cutting block 160. The tubular feature of the cutter 165 prevents the cutting edge 166 from spreading away from the juxtaposed edge of the fixed cutting-block 160, thereby insuring proper cutting at all times.

Rotary motion is imparted to the tubular cutter 165 by means of a drive pin 168 which is interlocked with one end of the tubular cutter in tongue and groove fashion at one of its ends and which is secured to or extended from an actuating lever 169 at its other end. The lever 169 is formed with a projection 170 which bears against an adjustable screw-stop 171 extending through a projection 172 formed integral with the cutter-supporting bracket 152. A coiled torsion spring 173, whose one end bears against the fixed projection 172 and whose opposite end movably bears against the actuating lever 169, returns the cutting edge 166 to a non-obstructing position relative to the slit 161 at the end of each cutting stroke thereby permitting the newly-severed end of the wire strand 95 to be advanced through and clear of the cutter unit and operatively positioned below the staple-forming mechanism.

A retaining screw 177 projects through the wall of the outer sleeve 151 and into an annular groove 178 formed on the exterior of the cylindrical pin 168, thereby locking all of the cutter elements in their respective operative positions.

The lever 169 is periodically or intermittently depressed by a vertical roller-follower 174 which coacts with a disc cam 175 fixedly secured to the drive shaft 108. If desired, the axial length of the roller-follower 174 may be vertically adjusted by screwing the lower extension 176 thereof, which contacts the cutter-actuating lever 169, further into or out of the body of the follower 174. The latter is slidably mounted in an opening 176ª formed in the casting 97.

As illustrated in Figures 2 and 8, the wire-stitching machine is driven by an electric motor 111, which is suspended from the drive-shaft housing 97, and which drives the relatively large rearwardly-disposed gear 109 through the pinion gear 110 mounted on the motor shaft. Referring more particularly to Figure 19, the gear 109 is shown rotatably mounted on the rear end of the drive shaft 108, which is journalled within the spaced main bearings 179, 179. The gear 109 is rotatably supported on the shaft 108 in any suitable manner, as for instance by means of a bearing 180, which is preferably driven into the hub of the gear 109.

The gear 109 is axially locked on the drive shaft 108 by means of a split collar 181 which is secured to the gear hub by the screws 182, only one shown, and which projects into an annular groove 183 formed at the end of the drive shaft 108. If desired, a hand wheel 184 may be secured to the very end of said shaft in fixed relation thereto, to provide means for manually motivating the stitching mechanism, as when making adjustments, etc. A split gear-guard or housing 185 encases both the relatively large diametered gear 109 and its associated meshing pinion gear 110, and may be affixed to the housing 97 by screws 186, 186.

A driving clutch plate 187 is fixedly clamped against the forward face of the hub of the gear 109 by means of clamping screws 188, only one shown. If desired, one or more pins 189 driven into the hub of the gear 109 may project through aligned apertures in the driving clutch plate 187, thereby to relieve the clamping screws 188 of shearing stress. The face of the driving clutch plate 187 is provided with a plurality of circularly arranged forwardly-projecting clutch teeth 190 which are adapted to engage and drive correspondingly arranged clutch teeth 191, extending rearwardly from the driven clutch plate 192. This driven clutch plate 192 is formed integrally with a slidable connector sleeve 193 which is slidably keyed to the drive shaft 108 by the key 194.

The driven clutch plate 192 is constantly urged towards the driving clutch plate 187 by a coiled compression spring 195. The fixed end of said spring 195 bears against an annular end flange on a collar 196, which is secured to the drive shaft 108 by a set screw 197, and the movable end of said spring bears against the inoperative face of an annular cam ring 198, which is rigidly secured to the axially slidable connector sleeve 193 by screws 199, 199 or the like.

As more particularly illustrated in Figures 19 and 21 to 24, inclusive, the operative rearwardly disposed face of the annular cam ring 198 includes two generally parallel dwell surfaces 200 and 201, with a riser surface 202, interconnecting the two. A stop member 203 is preferably provided near the trailing end of the dwell 201 for a purpose which will presently appear.

A spring controlled normally latched clutch throw-out plunger 204 is slidably disposed within a suitable opening 205 drilled in the casting 97, and is transversely fixed by the wall of opening 205. This plunger is normally urged inwardly towards the drive-shaft 108 and into engagement with the cam ring 198 by a coiled compression spring 206 whose movable end bears against said clutch throw-out plunger 204, and whose opposite fixed end bears against a spring-retaining plug 207.

That side of the tip of the plunger 204 which faces the cam ring 198 is bevelled as at 214, to conform with the slope of the riser surface 202, thereby to insure surface to surface contact between plunger and cam.

Electrically controlled means are provided for retracting the clutch throw-out plunger 204 against the action of the compression spring 206, thereby to render it inoperative and permit the clutch to be engaged. Such means include an electric solenoid 208 having a helical winding controlling slidable armature 209, formed with a head 209ª, and the motion of said armature in one direction is transmitted to the clutch throw-out plunger 204 by a suitable latching means in the form of an intervening linkage, as for instance by means of the connecting link 210 pivotally attached by head 209ª and the arm 210ª of an associated pivotable bell-crank lever 211, which has its other arm 211ª bearing against a projecting pin 212 extending from the clutch throw-out plunger 204. A slot 213 in the casting 97 permits the plunger pin 212 to project from the casting and to reciprocate without interference from said casting. The lever 211 is pivotally supported from the casting 97, as at 212ª.

Assuming the clutch to be disengaged and the gear 109 and the associated driving clutch plate 187 to be rotating, the clutch is made active by electrically energizing the solenoid winding 208, thereby attracting the armature 209 and rocking the bell crank lever 211, and accordingly retracting the clutch throw-out plunger 204. As the tip of the plunger 204 clears the outer periphery of the cam ring 198, the latter is freed, and the theretofore inoperative driven clutch member 192, which is rigidly connected to the cam ring 198, will be slid axially along the drive shaft 108 by the compressed clutch spring 195, and into operative engagement with the driving clutch member 187. The rotary movement of the driving clutch member 187 will be imparted to the driven clutch member 192 through the mutual engagement of their respective teeth 190 and 191; the drive shaft 108 will accordingly be rotated, and will actuate its associated mechanisms.

As long as the solenoid 208 is energized, the clutch throwout plunger 204 will be held in an inoperative position. However, just as soon as the solenoid circuit is interrupted, the now unopposed plunger spring 206 will push the tip of the plunger 204 into the path of the revolving riser surface 202. Upon the engagement of said revolving riser surface 202, which is axially slidable along the drive shaft 108, with the tip of the transversely fixed plunger 204, the driven clutch plate 192 will be axially retracted against the influence of the clutch spring 195 by an amount sufficient to disengage the clutch teeth 190 and 191. The plunger 204 thus throws out the driven clutch member 192 and disengages the clutch.

The momentum of the moving parts will cause the drive-shaft 108 to rotate until the stop portion 203 encounters the inwardly projecting tip of the plunger 204, at which point the moving parts will come to rest. This feature prevents the stitching mechanism of the machine from repeating a stitch of its own momentum.

The hereinabove described clutch and its control means overcomes many disadvantages inherent in prior art clutches. Thus, by virtue of the wholly tangential or transverse character of the impact force exerted on the tip of plunger 204 by the rotating cam ring 198, no longitudinal force is applied thereto tending to push the plunger back against its spring 206. This spring therefore need only exert a relatively weak force on the plunger 204 and accordingly only a slight pull will suffice to retract said plunger against the influence of said spring 206. This arrangement permits the use of a relatively small and inexpensive electric solenoid to operate the throw-out plunger.

Moreover, the hereinabove described clutch construction provides a reliable single-stroke arrangement which will actuate the machine for only one cycle when the solenoid is instantly de-energized. Furthermore, there exists no appreciable lag between closing the solenoid circuit and engaging the clutch, and vice versa, for the response is practically instantaneous.

As more particularly illustrated in Figures 8 and 20, in addition to the cutter-operating disc cam 175 and feed-roll driving gear 107 which are keyed to the front end of the drive shaft 108, a crank disc 215 is also keyed thereto, and the rim of said crank disc serves as a cam for actuating a roller-follower 216 which cooperates with a pivoted anvil 217 in a manner to be described more particularly hereinafter. The follower 216 corresponds in form to the follower 174 and is slidably mounted in an opening 216ª formed in the casting 97. The follower 216 at its lower end includes a vertically adjustable extension 216ᵇ for increasing or decreasing the length thereof. The openings 176ª, 216ª are disposed in parallel relation. The follower 216 is of less length than the follower 174. The casting 97 is provided with an opening 216ᶜ between and which communicates with the openings 176ª, 216ª. Arranged within the opening 216ᶜ is a stop 216ᵈ common to the followers 174, 216 for limiting the extent of the movement of the followers to active position, as well as to slidably couple the followers to casting 97. The followers have milled flats 216ᵉ for correlation with the stop 216ᵈ.

A crank pin 218 is carried by the crank disc 215, and serves to connect the overlapped crank ends of two connecting links 219 and 220, respectively (shown in dotted lines in Figure 26), to the rotatable crank disc 215. The disc 215, pin 218 and links 219, 220 constitute an operating or driving means for the stitching mechanism 97ª. The latter is termed a staple forming and driving mechanism and includes a reciprocatory staple forming bar 221 and a reciprocatory staple driving bar 224. The mechanism 97ª will now be described. The connecting link 219 is connected to the staple-forming bar 221 by a pin 223 which extends from the bar 221 and through the end of the link 219, and said link 219 transforms rotary movement of the crank pin 218 into a reciprocating movement of the staple-forming bar 221. As illustrated in Figures 26 and 27, a pair of spaced vertical guides 222, 222, one is formed integrally with the front cover plate 119, and the other is secured to the head casting 97, slidably confine the bar 221 and guide it during its reciprocations.

The connecting link 220 is connected to the staple-driving bar 224 by a pin 223ª which extends from the bar 224 and through the end of the link 220, and said link 220 transforms the rotary movement of the crank pin 218 into a reciprocating movement of the staple-driving bar 224. In the preferred embodiment of the present invention, the staple-driving bar 224 is positioned immediately behind the staple-forming bar 221, and reciprocates between the same spaced vertical guides 222, 222 which guide the staple-forming bar 221 during its reciprocations.

The lower end of the staple-forming bar 221 is provided with a pair of spaced staple-formers 225, 225, preferably positioned a sufficient distance apart to just straddle the anvil 217. The inner opposed faces of these staple-formers 225, 225 are provided with vertical grooves 226, 226 of a width and depth determined by the cross-section of the wire strand 95 from which the staples are formed. These staple-forming members 225 are formed separately of and are connected to bar 221 by any suitable means, as for instance, the screws 227, 227.

The lower end of the driving bar 224 is provided with a staple-driving member 228, bearing on its opposite sides the ribs or projections 229, 229 which slide within spaced grooves 226, 226 formed in the staple-forming members 225, said grooves being co-planar with respect to the projections 229, 229. The staple-driving member 228 may be formed integrally with or separate the driving bar 224, by way of example it is shown as being connected to the lower end of the bar 224, by means of a cross-pin 230 (Figure 20). This pin 230 extends across a slot 231 disposed at the lower end of the driving bar 224, and has its opposite ends anchored in said bar 224 on either side of said slot 231. The upper end of the staple-driving member 228 is positioned within the slot 231, and is formed with a transverse slot 232 to receive the exposed intermediate portion of the cross-pin 230, thereby to lock staple-driving member 228 to the driving bar 224.

It will thus be seen that as the drive shaft 108 is rotated, both the staple-forming members 225, 225 on the one hand, and the staple-driving member 228 on the other hand, will be reciprocated vertically, although not in unison, through the medium of the crank pin 218 and the connecting links 219 and 220. Actually, although both the staple-forming members 225 and the staple-driving member 228 descend on each down stroke of the crank pin 218, yet these members do not descend in synchronism.

Thus, due to the unlike instantaneous positions of the connecting links 219 and 220 relative to their common driving crank, the bar 221 and staple-forming members 225 will be driven downwardly at the initial portion of the crank-pin downstroke at a faster rate than the bar 224 and staple-driving members 228. When the crank pin completes its first quarter-turn and is at the 90° position shown in Figure 30, the lower ends of the staple-forming members 225 and of the staple-driving members 228 are furthest apart. During the second quarter-turn of the crank pin, the downward velocity of the staple-driving member 228 increases and exceeds that of the staple-forming members 225, which decreases. When the crank pin completes its second quarter-turn and is at the 180° position shown in Figure 32, the lower ends of both staple-forming and staple-driving members will again be caught up to each other. In other words, on each downstroke of the crank pin, the staple-forming members 225, 225 descend ahead of the staple-driving member 228, and the latter catches up to the former at the end of each downstroke.

The relative movements of staple-forming members and the staple-driving member are as follows: Assuming that the crank pin is describing its down-stroke, both staple-forming and staple-driving members are driven downwardly, the staple-forming members descending ahead of the staple-driving member. At the end of the down-stroke, the staple-driving member has caught up to the staple-forming members, and they again bear the same relative positions as at the beginning of the down-stroke. On the up-stroke of the crank pin, both the staple-forming and staple-driving member are lifted, but this time they move in reverse order, the staple-driving member being lifted ahead of the staple-forming members. At the completion of the inoperative up-stroke, the staple-forming members catch up to the staple-driving member, completing one cycle of operation.

In the preferred embodiment of the present invention, the connecting links 219 and 220, and the elements driven thereby are preferably so proportioned that the lower ends of the staple-forming members 225, 225 will substantially coincide with the lower end of the staple driving member 228 when the crank pin 218 is positioned either directly above or directly below the axis of the drive shaft 108.

The pivoted anvil 217 illustrated in Figures 20 and 26 is journalled on a fulcrum pin 233, carried by casting 97, and is provided with a trough 234 into and through which the wire strand 95 is fed by means of the hereinabove described feed-rolls. The lower end of the adjustable cam roller-follower 216 bears against a rearwardly-extending projection 235 on the anvil 217, and when actuated by the cam 215 serves to block said anvil and prevent it from being swung backwardly into an inoperative position over a predetermined portion of each cycle. Thus, when the radially outermost portion of the cam disc 215 bears down against the roller-follower 216, a downward force exerted on the anvil 217 in the vicinity of the trough portion 234 thereof will not result in any tilting or turning of the anvil 217, for the anvil is temporarily blocked by the cam-obstructed follower 216. However, when the cam disc 215 has rotated sufficiently to free the upper end of the roller-follower 216, a downward force exerted on the front of the anvil 217 will result in said anvil being pivoted or swung rearwardly into an inoperative position, lifting the cam follower 216.

In the preferred embodiment, the anvil 217 is provided with a stop portion 236 which operatively abuts against the casting 97, to limit the return or forward swing of the anvil, thus insuring proper alignment of the trough 234 with the wire strand 95.

An anvil-pivoting cam pin 237 projects outwardly from the anvil 217 into the path of the staple-driving member 228. In actual operation, the lower tip of the driver 228 descends and encounters the surface of the cam 237, and since at this phase of each cycle, the cam disc 215 has freed the upper end of the anvil-fixing follower 216, the anvil 217 is swung into an inoperative position on the pin 233. On the inoperative return or up-stroke of the driver 228, the cam disc 215 engages the anvil-fixing follower 216 and swings the anvil 217 into its operative position just as the lower tip of the ascending driver 228 clears the cam 237.

The anvil-pivoting cam pin 237 is formed in a manner to deflect and guide the severed end of the wire 95 into the anvil trough 234 should the wire become slightly mis-aligned relative thereto.

The machine includes a staple-supporting member 238 of angular form which is adapted to enter between the downwardly-depending legs of the staple as soon as the latter are bent into shape, thereby to support the formed staple internally. The upper end of the staple-supporting members 238 is pivotally retained in a slot 239 formed in the staple-forming bar 221, by means of a cross pin 240, which projects transversely across said slot and through the upper end of said staple-supporting member 238.

Means are provided for constantly urging the staple-supporting member 238 into an operative position between the legs of the formed staple. Such means includes a coiled tension spring 241 having one end hooked through an abutment pin 242, which extends from the staple-forming bar 221 and through a suitable slot 243 formed in the staple-supporting member 238, and said spring has its opposite end hooked through an abutment pin 244 which projects from the upper end of the staple-supporting member 238.

In order to avoid conflict between the staple-supporting member 238 and the anvil 217, camming means are provided for causing the staple-supporting member 238 to follow a path clear of the anvil 217, such as the path shown by the dashed-dotted line in Figure 20. Such means includes a pair of spaced roller followers 245, 245 which straddle the staple-supporting member 238 and are rotatably supported relative thereto by a transverse shaft 246 which projects through the staple-supporting member 238. The contractions of the spring 241 urges these roller followers 245, 245 against the cammed surfaces of a pair of downwardly-depending members 247, 247 which straddle the staple-supporting member 238. These members 247, 247 are formed integral with a plate 248, which is secured to the front of the spaced vertical guides 222.

In actual operation, the wire is cut, bent into the form of a staple and supported and driven into the work in the following manner. As the wire gripping portions 93 and 94 of the feed rolls 91 and 92 grip and feed the wire strand 95 through the wire-guiding strips 149, 149, through the slot 161 of the cutter unit 150 and into, and through the trough 234 of the temporarily-fixed anvil 217, and the staple-forming members 225, 225 descend ahead of the staple-driving member 228 and approach the anvil 217.

At the end of the wire-feeding phase (determined by the trailing end of the feed-roll wire-gripping portion 94) the cutter-operating cam disc 175 depresses its follower 174, causing the cutting edge 166 to sever the wire strand. Immediately thereafter, the staple-forming members 225, encounter the horizontally extending end portions of the severed wire $95^b$ (which project beyond the anvil trough 234 in either direction) and bend these projecting portions downwardly over both sides of the temporarily-fixed anvil 217 to form the legs $95^c$ of the staple $95^d$, all as more particularly illustrated in Figure 29. As the staple-forming members 225 continue to descend, the downwardly bent leg portions of the staple enter into the spaced vertical grooves 226 of said staple-forming members. The lower tip of the staple-driving member 228, which member has been descending at a slower rate than the staple-forming members, then encounters the anvil-pivoting cam surface 237 of the now freed anvil 217 (cam disc 215 having rotated a sufficient amount to free said anvil) and swings it rearwardly into an inoperative position, causing the anvil trough 234 to leave the crown portion of the formed staple, said staple being held within the vertical grooves 226.

As the anvil is pushed out from between the downwardly depending legs of the formed staple, the spaced rollers 245 which are pressed against the cam members 247 by the tension spring 241, ride over the sloping surface 249 of member 247, thereby permitting the tip of the staple-supporting member 238 to enter and fill the gap between the legs of the staple. The formed staple is then brought downwardly in proper alignment with the work $249^a$ by the descending members 225 whose lower ends contact and compress the work layers $249^b$ to be stapled together at the end of their down stroke, all as more particularly illustrated in Figure 31.

As the crank pin rotates from the position shown in Figure 31 to that shown in Figure 32, the staple-forming member 225 dwells or comes to rest against the work and the descending staple-driving member 228 thrusts the staple-supporting member 238 aside and simultaneously drives the completely supported staple $95^d$ directly into and through the work; the penetrating leg portions of the staple being clinched on the underside of the work by the fixed clinching member 250, as at $250^a$ (Figure 32). It will be noted that at this phase of the cycle the staple-forming members 225 are motionless and compress the work while the driver descends and drives the staple through the work.

It will be seen that the staple is completely supported on all sides internally and externally, as it is driven into the work, whereby buckling and other defections are avoided.

If desired, connecting link 219 may be made somewhat longer than the link 220, and thereby to increase the dwell period of the members 225 at the end of their downstroke according to another phase of the present invention, the dwell period of the staple-forming members 225 at the end of their down-stroke may be delayed by connecting the upper end of the connecting link 219 to the staple-forming bar 221 in eccentric fashion, as more particularly illustrated in Figures 26 and 28 to 32, inclusive.

In the alternative or modified construction illustrated in Figures 33 and 34, the dwell period of the staple-forming members 225, 225 at the end of their down-stroke is increased by providing an eccentric disc 251 rotatably mounted on the crank pin 218 and keyed or fixed relative to the driver connecting link 220 by means of a pin 252. The lower end of the former connecting link 219 is rotatably mounted over the eccentric 251 and therefore the path described by the lower end of the former connecting link will be somewhat flattened thereby, to provide a longer dwell for the staple-forming members 225, 225.

The invention includes novel means for safeguarding the limbs of the operator against injury by the machine, are more particularly disclosed either in Figures 35 and 36, or in Figures 37, 38 and 39. Although, in the accompanying drawings, these phases of the invention have been incorporated in a wire-stitching machine, it is to be understood that they are of wider application, and are useful in many other environments, and may be incorporated in other machines, such as riveting machines, eyeleting machines, punch presses, or the like.

In the particular embodiment illustrated in Figures 35 and 36, means are provided for automatically disconnecting the power, as for instance by temporarily disengaging the driving and driven clutch members, once during each down stroke of the staple-forming and staple-driving members just after the staple is formed, the moving parts being permitted to continue or follow through of their own momentum for a predetermined portion of each cycle, and for re-applying the power by re-engaging said disengaged clutch members near the very end of the downstroke, provided the moving parts have meanwhile encountered no obstacle. The hands of the operator therefore are safe from injury for it is impossible to interpose them between the relatively approaching power-driven parts, since power on the down-stroke is resumed only after the parts are too close together to permit the hand to be slipped therebetween.

Such means is electrically controlled and includes a circular cam segment 252 secured to the slidable sleeve 252ª corresponding to the sleeve 193 and having a riser surface 253 and a dwell surface 254, similar to the corresponding riser and dwell surfaces 202 and 201 on the cam ring 198 illustrated in Figure 24. A stop 255, corresponding to the stop 203, is provided at the trailing end of the dwell surface 254. The said means is to include the solenoid 208 and its armature 209 (Figure 19). The said means also includes a throw-out plunger 256 controlled from the solenoid 208 and connected with the armature 209.

When the electrically-controlled clutch throw-out plunger 256 is retracted, by means of the electric solenoid connected therewith through the links 257 and 258, the sleeve 252ª is freed and will be advanced by the compression spring 259, thereby engaging the clutch. When the flow of electric current through the solenoid is interrupted, the plunger spring 260 advances the throw-out plunger 256, which is then met and engaged by the revolving riser surface 253, causing the circular cam segment 252 and associated slidable sleeve 252ª to be retracted, thereby disengaging the clutch.

The circular cam segment 252 further includes a second riser surface 261 and dwell surface 262, which coact with a fixed throw-out pin 263 to throw out the clutch for a period determined by the arcuate length of the dwell surface 262, and this occurs once during each complete revolution of the circular cam segment 252. If there is no obstruction interposed between the descending staple forming members 225 and the work, and if the parts are properly lubricated the momentum or inertia of the moving parts will suffice to carry the trailing end of the dwell surface 262 past the fixed throw-out pin 263 whereupon the compressed clutch spring 259 will re-expand, thereby re-engaging the clutch, after which the moving parts will again become power-driven.

At that phase of each cycle during which the dwell surface 262 rides over the fixed throw-out pin 263, the continued movement of the machine parts is due solely to their own momentum, assisted possibly by the force of gravity acting upon descending members, and accordingly if the descending parts encounter any obstruction such as the accidentally misplaced hand of the operator, the moving parts (which are then not power-driven) will instantly come to rest. When no obstacle is present, the entire dwell surface 262 is permitted to ride past its associated fixed throw-out pin 263, whereupon power is again applied to the moving parts to complete the downward stroke and carry the parts through their inoperative return stroke.

Although the fixed throw-out pin 263 has been shown spaced approximately 45° away from the solenoid-operated clutch throw-out plunger 256, the relative angle between the two may be varied to suit the individual requirements of each application of this safety feature, and in accordance with the particular phase of each cycle during which it is desired that power be disconnected.

If desired, the throw-out pin 263 may be made adjustable in a tangential direction, thereby to vary the point at which the clutch is re-engaged. Thus, for instance, by merely rotating the throw-out pin 263, the point at which the trailing end of the dwell surface 262 clears the forward end of said pin may be advanced or retarded, thereby advancing or retarding the re-engagement of the clutch.

In the event that the machine has been arrested by the presence of a foreign article, the latter may be withdrawn from its obstructing position, and the machine may then be set into motion by seizing the hand wheel 264 and manually rotating the drive shaft 108 by an amount sufficient to cause the dwell-surface 262 to clear the pin 263, thereby permitting re-engagement of the disengaged clutch members.

In addition to providing means for protecting the limbs of the operator, the hereinabove described construction will also readily indicate any undue friction or other improper operation of the moving parts of the machine. Thus, if the moving parts should be retarded by the development of excessive friction or by any other cause, the momentum of the moving parts will be insufficient to carry through, and the machine will accordingly come to rest, and become temporarily inoperative. This situation will warn the operator that the machine is not functioning properly and should be lubricated or otherwise serviced. The machine will therefore operate only efficiently and will automatically warn the operator of the need for servicing the same.

In the particular embodiment illustrated in Figures 37, 38, and 39, means are provided for preventing the initial engagement of the driving and driven clutch members if the operator's hand or some other obstacle is disposed between the relatively approaching parts of the machine, and once the machine is operating continuously, for immediately disengaging the clutch upon the inter-position of an obstacle within the danger zone and such means includes an exploring ring guard or shoe 265 which preferably circumscribes the projected area of the descending machine parts, and which is preferably adjustably mounted on the lower end of a vertically reciprocable rod 266 slidable through the guide hole 267 formed in the casting 97. A set-screw 268, which is threadedly engageable with the ring guard member 265 and has its forward tip bearing against the reciprocable rod 266, may be loosened to permit the ring guard member 265 to be vertically adjusted, and may thereafter be tightened to fix said guard in its newly adjusted position.

The forward tip of a tiltable lever 269, fulcrumed about a transverse pivot pin 270 fixedly related to the casting 97 projects into a transverse slot 271 formed at the upper end of the reciprocable rod 266. A cam disc 272, keyed or otherwise fixedly related to the drive shaft 108, coacts with a pivoted follower arm 273 whose fixed end is pivotally secured to the casting 97 by a pivot pin 274, and whose movable end actuates the lever 269 by means of the connecting thrust link 275.

The rear end of the lever 269 is pulled upwardly by a coiled tension spring 276, hooked at one end to a fixed pin 277 extending from the casting 97, and having its opposite movable end hooked around a pin 278 extending from the lever 269 whereby the pivoted follower arm 273 is maintained in sliding engagement with the cam disc 272 when permitted.

The lever 269 is restrained from tilting by a pivoted solenoid-controlled latch 279, having a notch 279a for receiving a pin 280 extending from the lever 269. A coiled tension spring 281, anchored at one end to the casting 97 and having its opposite movable end secured to a lever 282 fixedly related to said latch 279 through a common shaft 283, serves to constantly urge the latch into an engaging position relative to the lever pin 280. This engagement may be interrupted and the lever 269 freed by energizing an electric solenoid, not shown, whose armature is connected at 283a to one end to a link 284. The other end of the link 284 is connected to the lever 282. The latch 279 is thus disengaged from the lever pin 280 in opposition to the force exerted by the spring 281.

One end of an axially slidable sleeve 285, which is for the same purpose as the slidable sleeve 252a of the embodiment illustrated in Figure 35, is provided with a series of clutch teeth 286 which are adapted to engage with, and be driven by, the juxtaposed clutch teeth 287 extending from the gear 288.

A pair of substantially semi-circular segmental cam plates 289 and 290 are preferably fixedly secured to the slidable and rotatable sleeve 285 on opposite sides thereof, i. e. in approximately 180° out-of-phase relation, and also in axially spaced relation from each other. Thus, if the sleeve 285 be viewed from one side when rotating, first one of these cam plates will be visible, and then the opposite one will appear. Each of these cam plates 289 and 290 preferably include a riser surface 291 disposed at their respective leading ends, and a dwell surface 292 which extends from said riser surface 291 up to the trailing end of the cam plate.

A cam roller-follower 293, which is preferably journalled on a pin 294 carried by a pivotally suspended lever 295, is arranged to be reciprocated to and fro by the cam plates 289 and 290 respectively as the operative surfaces thereof encounter and sweep past said cam roller-follower. Thus, assuming the sleeve 285 to be rotating, and the roller 293 to be positioned as shown in Figure 37, the dwell surface 292 of the cam plate 289 will continue to sweep past the roller 293 without moving it axially, but immediately thereafter the riser surface 291 of the opposite cam plate 290 will encounter said roller 293 and will move it to the left until the roller rides up on the dwell surface 292 of said cam plate 290. The roller 293 will remain in this new left position until it is pushed to the right and returned to the position shown in Figure 37 by the riser surface 291 at the leading end of the cam plate 289. Accordingly, the roller 293 and its associated pivotally suspended lever 295 will tend to reciprocate to and fro in response to the intermittent oppositely directed forces on the roller by the revolving staggered cam plates 289 and 290.

The pivotable lever 295 is pivotally secured at its upper end to the casting 97 in any suitable manner, as for instance by means of a fulcrum pin 296 which extends from said lever 295 and is journalled within a suitable opening in and connected to the casting 97. The lower end of this pivotable lever 295 is provided with a transversely extending latch-engaging pin 297 which is adapted to co-act with the notch 297a in a generally horizontal disposed pivotable spring latch 298. One end of this latch 298 is secured to the casting 97 by means of a pivot pin 299 or the like.

When the latch 298 is lifted sufficiently to free the latch-engaging pin 297 on the end of the pivotally suspended lever 295, the cam roller 293 will be permitted to reciprocate to and fro as above described. However, if the latch 298 is lowered sufficiently to catch or engage the reciprocating lever pin 297, the pivotable lever 295 will become fixed against movement towards the right, and accordingly when the riser surface 291 at the leading end of the cam plate 289 sweeps past the roller 293, instead of this roller 293 being moved to the right as formerly, the sleeve 285 will be cammed to the left against the force exerted by the clutch spring 300, thereby disengaging the clutches 286 and 287. In other words, upon the engagement of the cam plate 289 with the cam roller 293, the latter will be moved to the right only if the lower end of the lever 295 (on which the roller is mounted) is free to move to the right. Thus, if movement of the lever 295 to the right is obstructed by the latch 298, instead of the roller 293 being moved to the right, the cam plate 289 and its associated sleeve 285 will be moved to the left, thereby effecting a disengagement of the clutch. In the event that the latch 298 is lifted at the proper time during each cycle to permit the lever 295 to swing to the right, that is to say, if the roller 293 remains unrestrained, the clutch teeth will remain in engagement permitting continuous operation of the machine.

The rear end of the tiltable lever 269 is projected upwardly, as at 301, for engagement with the underside of the roller-arresting latch 298, so that each time said rear end of lever 269 is permitted to rise sufficiently for such engagement it will lift said latch 298 clear of the co-acting pin 297.

In actual operation, and assuming the stitching mechanism to be at rest, the respective parts will be in the positions shown in Figure 37. If the solenoid, which controls the movement of the spring-pressed latch 279, is now energized, the connecting link 284 will be pulled to the right in the direction of the arrow 302 causing the lever 282 and its associated latch 279 to pivot in a counterclockwise direction, in opposition to the force exerted by the tension spring 281. The lever pin 280 which was formerly positioned with the notch of the latch 279 is thus freed, whereupon the combined weight of the ring guard 265 and rod 266, applied at the forward end of the tiltable lever 269, and aided by the upward force exerted by the extended tension spring 276 at the rear of said lever, will cause the lever 269 to tilt or turn in a counter-clockwise direction pushing the pivoted follower arm 273 upwardly within range of the cam disc 272. Simultaneously therewith, the upwardly moving rear projection 301 on the tilting lever 269 engages the underside of the roller-arresting latch 298 and lifts the latter clear of the pin 297 projecting from the lower end of the pivotable lever 295, thereby freeing said lever and its associated roller 293 for movement to the right in the direction of the arrow 303.

If any foreign object, such as the fingers of an operator, or the like, is interposed between the descending ring guard 265 and the work to be stitched, the ring guard 265 will not be permitted to descend to the full extent necessary to bring the lever end 301 up against and/or lift the latch 298 (i. e., down to the work itself), and therefore the clutch will remain disengaged. However, should the ring guard 265 be permitted to descend to its full extent (the lower limit of which descent may be adjusted by raising or lowering the ring guard 269 on the reciprocable bar 266), the latch 298 will be lifted out of engagement with the pin 297 by means of the end 301 of the lever 269, thus permitting the clutch spring 300 to thrust the sleeve 285 rearwardly in the direction of the arrow 303, thereby to engage the clutch teeth 286 and 287.

After each completed down-stroke of the ring guard 265, the latter is lifted by means of the cam disc 272 and its associated pivoted follower 273, and at the top of each return stroke the latch pin 280 of the tiltable lever 269 is brought within range of the latch 279.

If the initial energization of the solenoid be continued, the latch 279 will be held in its inoperative position, and the machine will be permitted to form and drive any desired number of staples into the work, each down-stroke of the moving parts being preceded by an exploratory down-stroke of the ring guard 265.

Each revolution of the cam plates 289 and 290 will reciprocate the roller-follower 293 to and fro, and so long as the reciprocation of this roller is permitted by the periodic lifting of the latch 298, the clutch teeth will remain in engagement with each other. However, should an obstacle be inserted between the descending ring guard 265 and the work, be it after the third, fifth or ninth stitch, the latch 298 will not be lifted, and therefore the pin 297 will engage and remain within the notch of said latch, and the lever 295 and its associated roller follower 293 will accordingly be locked against movement to the right, i. e., in the direction of the arrow 303. Therefore, when the leading end 291 of the cam plate 289 encounters this now-fixed roller 293, the cam 289 together with its associated sleeve 285 and driven clutch teeth 286 will be thrust to the left in a direction opposite that indicated by the arrow 303, thereby disengaging the clutch.

A removal of the obstruction between the ring guard 265 and the work will permit the arrested machine to resume its operation and complete only the next stitch, subsequent stitches being dependent upon the continued energization of the solenoid. If the solenoid be deenergized, the latch 279 will immediately be swung into its operative pin-engaging position by means of the tension spring 281 and will accordingly engage the pin 280 when the latter is next brought upwardly within range of the notch in said latch, said upward movement being effected by the down thrust exerted on the lever 269 by the rotating cam disc 272 through its associated follower 273 and connecting link 275. The lever 269 being thus restrained, the latch 298 accordingly will not be lifted by the end 301 thereof, and the roller-follower 293 will therefore be locked against movement to the right, resulting in disengagement of the clutch.

A stop member 304 is provided on the rear of the cam plate 289 and coacts with a fixed lug or projection 305 extending from the casting 97, solely when the sleeve 285 is retracted, in order to insure that a subsequent stitch will not be formed by virtue of the momentum of the moving parts after the clutch has once been disengaged.

As more particularly illustrated in Figure 40, the unit or head 63 of the hereinabove described wire-stitching machine may be swivelled or turned through an angle of approximately 90° relative to the work-supporting stitcher-arm 54, and may be operatively clamped at any desired angle between its limits by means of the clamping bolt 65, Fig. 4 whereby the angle of the stitch relative to the arm, and therefore relative to the work, may be varied at will. In the preferred embodiment, the vertical axis about which the head or unit 63 swivels passes through the center of the crown of the stitches formed thereby.

By means of the foregoing swivelling arrangement, the unit or head 63 may be set for operation in a position generally perpendicular to the arm 54 (which parallels the overhanging supporting arm 52), as illustrated in Figures 1 and 2, and in full lines in Figure 40, to provide a stitch whose crown is generally parallel to said arm 54, or said unit or head 63 may be set for operation in a position generally parallel to the arm 54, as indicated in Figures 1 to 3, inclusive, and in dotted lines in Figure 40, to provide a stitch whose crown is generally perpendicular to said arm, or else the unit or head 63 may be set for operation in a position generally intermediate the two foregoing positions, as for instance at an angle of approximately 45° to said stitcher arm 54. It will be noted that all the moving parts associated with the unit 63, as for instance the spool-supporting structure, the wire-feeding members, the wire-cutting device, the actuating motor, etc. will move simultaneously as unit 63 is swung from one position to another.

It is customary to employ an accessory device known as a "stitcher tongue" when stitching the seam of tubular-shaped work 309 of any considerable length. Such stitcher tongue is normally pivotally hung or suspended from the stitcher unit, with its tip resting against the relatively fixed work-supporting surface. According to another phase of the present invention, and as more particularly illustrated in Figure 41, means are provided whereby the angular relation between the adjustable unit 63 and the stitcher tongue 310 suspended therefrom may be carried or changed at will, to vary the angle of the stitches relative to the seam of the work 309.

Thus, the stitcher tongue 310 is pivotally supported by means of a pin 311 journalled within the lower end of the tongue-supporting arm 312, whose upper end is preferably slidably connected to an arcuate member 313 having an inverted T-shaped slot 314 traversing its arcuate or curved edge. The member 313 has an upstanding arm 313a secured to the casting 97. A nut 315 is threadedly mounted on a clamping bolt 316 whose head is slidably disposed within said T-slot 314 and whose shank passes through a suitable opening in the upper end of the tongue-supporting arm 312, whereby said arm 312 may be clamped at any point along the curved periphery of the arcuate member 313. If desired, this member 313 may be mounted for vertical adjustment and for such purpose a pair of clamping screws 317, 317 are employed, which may project through vertical slots 318, 318 in the arm 313a of the arcuate member 313 and engage in the casting 97.

In actual use, if it is desired to change the direction of the stitch relative to the seam of tubular work, as for instance, from one parallel or said seam (as shown in Figure 41) to a stitch disposed at an angle of 45° relative to said seam, all that need be done is to loosen the clamping nut 315, and to shift the upper end of the tongue-supporting arm 312 along the periphery of the arcuately curved member 313 through an angle of 45°, and to thereafter re-clamp said arm 312 by tightening the nut 315. The unit 63 and its adjusted stitcher tongue 310 may then be swung into the 45° position shown in dashed-dotted lines in Figure 40, and the stitching tongue 310 will then be pointing in the same direction in which it pointed before the adjustment was made (i. e. perpendicular to the overhanging arm 52) and the tubular unstitched work may then be fed in the same direction as formerly, and its seam stitched by individual staples each forming an angle of 45° to said seam.

In the preferred embodiment of the present invention, an electrical output 306 of suitable form is secured on one of the overhanging arms 52. Into this output is inserted a pair of plugs separately connected to the electric solenoid 208 and to the electric motor 111 respectively by flexible electric circuit wires 306a, 306b respectively of sufficient length to permit unhindered angular adjustment of the unit 63. The flow of current through the electric solenoid 208 may be controlled by a foot switch 307 provided with an overhanging guard 308 for preventing accidental closing of the foot switch. An "off and on" master switch 309, housed within the column 51, is provided for the purpose of controlling the flow of electrical current to the machine.

With reference to Figures 42 to 44 a modified form of wire supplying, unwinding, guiding and tensioning structure indicated at 320 is shown. The difference between the structure 320 and the structure 66a resides in the manner of setting up the braking pressure applying means and the braking pressure modifying means. With reference to Figures 42 to 44 a stationary shaft corresponding to the shaft 76 of structure 66a is indicated at 321. The shaft 321 is mounted in a manner similar to the shaft 76. Pivotally mounted on the shaft 321 is a bell crank lever 322 formed with an upper arm 323 and a lower arm 324. The upper arm 323 extends inwardly at an upward inclination with respect to the upper end of arm 324. The upper end of arm 323 is enlarged and of curved contour to constitute a brake shoe 325. The latter is of segmental contour and extends from both sides of the arm 323. The providing of the enlarged upper end of the arm 323 to constitute a brake shoe is due to a tensioning device consisting of a supporting member 338 formed of a head 339 fixedly secured to the bracket 66. The member 338 is disposed horizontally and includes a reduced peripherally threaded stem portion 340 integral with the outer end of head 339. The stem 340 extends through an opening 341 formed in the lower end of the arm 324. The arm 324 is slidably mounted on stem 340. Slidably engaging with the stem 340 is an adjusting nut 342 and encompassing the stem 340 and interposed between the arm 324 and the nut 342 is a coiled tensioning spring 343. The nut 342 provides for increasing and decreasing the tension of spring 343. The tensioning device aforesaid preferably normally exerts a sufficient pull on the bell crank lever 322 to cause the shoe 325 to bear against the brake drum 70 with sufficient pressure to prevent rotation of the spindle 68 and accordingly the reel or spool 71.

A sleeve 327 is journaled on the fixed shaft 321 adjacent the hub of the bell crank lever 322 and said sleeve 327 is prevented from sliding off from shaft 321 by a sleeve retaining collar which is fixed to shaft 321. One end of the sleeve 327 has extending therefrom a crank arm 328 formed with an enlarged outer end provided with an opening 329. Secured to one end of the brake shoe 325, as at 330 is a vertically disposed supporting member 331 formed of a head 332 and a peripherally threaded stem 333 which is of reduced thickness with respect to the head 332. The head 332 seats on the enlarged outer end of the crank arm 328. The stem 333 extends downwardly through the opening 329 and has threadedly engaging with the lower end portion thereof an adjusting nut 335. Surrounding the stem 333 and interposed between the enlarged outer end of the crank arm 328 and the nut 335 is a tensioning spring 336. The tension of the spring 336 is adjusted by the nut 335. The lower end 334 of the head 332 seats on the top edge of the enlarged outer end of the crank arm 328.

The bell crank lever 322 and the arrangement of the parts 338 to 343 inclusive with respect to the arm 324 of lever 322 provides what may be termed a brake pressure applying means. The sleeve 327 and the arrangment of the parts 331 to 336 both inclusive relative to the arm 328 of the sleeve 327 provides what may be termed a braking pressure modifying means.

Other than the parts described with respect to the structure 320 the remaining parts of such structure correspond to parts of the structure 66a and are designated similar to said parts of such structure 66a.

The structure 320 functions for the same purpose as the structure 66a.

The modified form of wire cutter mechanism shown by Figures 45 to 52 is generally indicated at 344 and it is to be arranged in juxtaposition relative to the outlet end of the wire guide provided by the strips 149 for the purpose of receiving the wire from such guide and severing off a predetermined length of the wire, after the wire has been fed through the anvil to the desired extent. The mechanism 344 is to be arranged in juxtaposition to one side of the anvil. The mechanism 344 will be arranged relative to the wire feed mechanism and the anvil in the same manner that the cutter mechanism 150 is positioned relative to said feed mechanism and anvil.

The cutter mechanism or unit 344 includes a bracket 348. This cutter supporting bracket is preferably slidably mounted on the housing 345 in any suitable manner as for example in the manner, shown in Figure 16, as is the previously described cutter unit 150 is mounted on to housing 97.

The cutter itself is cylindrical in form and includes in the present embodiment a stationary hollow stem 353 fixedly mounted in bracket 348 through opening 350. A set screw 363 which threadedly engages bracket 348 is passed through a tapped hole 351 and has a cylindrical end 364 which enters hole 362 in stem 353 holding said stem in fixed axial and annular position. A cylindrical opening indicated at 359, 360 and 361 extends transversely and laterally through stem 353 at its forward end 354. This opening slidably receives cutter block 365 indicated in Figure 46. This cutter block is longer than the diameter of stem 353 and extends beyond its periphery on that side on which the wire enters. The opposite end is flush and conforms generally with the periphery of the stem 353. The cutter has a groove 374 extending its full length to receive the wire. This groove is of dimensions to receive the wire and preferably inclined at an angle with the axis of stem 353 in order to urge the wire towards the center of the cutter block when it is severed by cutter 379. This incline of the groove also effects a gradual shear when flat wire is used.

The cutter block 365 includes a body part 366 having a rounded top 367, a rounded bottom 368, a rounded split front 369 and a flat rear 370. The ends of the body part 365 are rounded or of arcuate contour as indicated at 371, 372.

The cutter block 365 is clamped in fixed relation to stem 353 by means of a pin 377 which extends through opening 356 in stem 353. A set screw 378 supplies the clamping means whereby pin 377 is forced against cutter block 365. A flat rear 370 on back of cutter block keeps the cutter block from revolving and holds it, with the cutter groove 374 in the desired angular position.

A hollow cylindrical cutter 379 formed of a body part 380 is rotatably mounted on stem 353 as at 384. Said body part 380 has a somewhat reduced outer end 381. This end forms a segment of an angularity to clear the protruding end 376 of cutter block 365 at one end and to clear the groove 374 at the other end, but of sufficient length to cover groove 374 when rotatably actuated by plunger 437 through lever 383. The cutter is confined axially by cutter block 365 in the front and by lever 383 in the back. The reduced outer end 381 of the cutter constitutes a blade or knife.

The back end of cutter 380 has notches 382 into which fits male portions 386 on lever 383. This lever is rotatably mounted on sleeve 353 and is axially confined by having a portion 383ᵃ of a flange like form disposed at the rear end of sleeve portion 385 of lever 383 and extending into the cut-out 352 in bracket 348. The bottom of this cut-out also limits the rotation of the lever 383 in the direction in which it is urged by spring 393. This spring extends from a fixed anchorage 391 on bracket 348 to a pin 392 on lever 383 and effects a return movement of lever 383 when this lever is actuated on and rotated by plunger 437.

Disposed on a pin 394, carried by the lever 383 is a roller 395, the position of which is such as to effect a rotation of the lever 383 and consequently the cutter when engaged by plunger 437.

In actual operation the device functions as follows:

The rotation of cam 175 actuates plunger 437 in a downward direction. This motion is translated to a slight rotary motion of lever 383 and cutter 379 around stem 353. The reduced outer end portion 381 of this cutter body severs the wire strand which has previously been fed through groove in cutter block 365. As the trailing end of cam 175 leaves roller on plunger 437 all the parts are returned to normal through action of spring 393.

The lower end of plunger 437 has two functions, namely that of actuating the cutter mechanism as described and that of fixing the wire forming anvil 396 against rotation as the loose ends of the wire are bent around the nose 408 of anvil 396. Thus two levels are provided for these functions as shown in Figure 52 and designated 437ᵇ and 437ᶜ. The extreme end 437ᵇ of plunger 437, which is the lower level actuates the cutter and the upper level 437ᶜ engages the tail end of the anvil 396.

When the end of the staple driver blade clears the cam pin 410ᵃ on its upstroke, anvil 396 is returned to operative position as shown in full line in Figure 52 against stop surface 396ᵃ by the action of spring 414 against pin or plunger 400, the end of which acts on the tail of anvil 396. In this position the wire may enter the trough 409.

As the cam 175 rotates, the plunger 437, Figure 45, is urged downward by cam rise 175ᵃ. This motion actuates the cutter, severing the wire. The plunger 437 reaches its extreme downward position as the cam roller engages the dwell surface 175ᵇ of cam 175. In this position the upper lever 437ᶜ on the lower end of plunger 437 has engaged the tail end of anvil 396 and remains in this position while the staple former ends 225, Figure 20 bends the loose ends of the wire around the nose 408 of anvil 396. After the wire has been formed the cam roller on plunger 437 recedes along the decline 175ᶜ on cam 175 freeing the anvil which is then forced out of the way when the tip of the staple driver 228 engages cam pin 410ᵃ of anvil 396 permitting the formed staple to be driven into the work. As the staple driver clears the anvil during its upstroke, the spring 414 again returns the anvil to operative position to receive the wire when it again will be locked against rotation while the staple is being formed.

With reference to Figures 52 to 57 inclusive a modified form of anvil and a modified form of staple pick-up means are shown and such anvil is generally indicated at 396 and such pick-up means at 397. The casting which corresponds substantially to the casting or housing 97 as indicated at 398, Figure 52. The surface 396ᵃ of the casting 398 forms a stop for anvil 396.

The anvil 396 is mounted for tilting or shifting on a pivot 399 supported by the casting 398 and has associated therewith a spring-controlled plunger or pin 400 slidably mounted in the casting 398 for the purpose of returning the anvil to operative position after the staple driver has ascended to above element 410ᵃ and holds anvil 396 in place while the wire is being fed thereto. The anvil comprises a body part 401 substantially of triangular contour and provided between its horizontal center and upper end with an opening 402 for the passage of the pin 399. The rear edge 403 for the major portion of its length of the body part 401 inclines upwardly and rearwardly from its lower end to a point in proximity to the horizontal upper edge 404 of body part 401. The remaining portion of the edge 403 of body part 401 is vertically disposed as at 405. The forward edge of body part 401 has a vertically disposed lower portion 406 and an upstanding rearwardly inclined upper portion 407. Formed integral with the edge portion 406 at the lower part thereof is a forwardly directed extension 408 cutout at its top edge as at 409 to form a trough. The body part 401 below and spaced from the opening 402 is provided with a horizontally disposed bore 410 extended from the edge portion 403 to the edge portion 406 and with its forward end of its wall flared as at 411. Carried by and secured to the anvil 396, as well as forming an element of the latter is an impactable element 410a which, when impacted upon provides for the anvil 396 shifting or tilting in a direction as indicated by the dotted line showing in Figure 52. The element 410a includes a shank 411a and a head 412 integral with the forward end of the shank 411a. The shank 411a is mounted in the bore 410. The head 412 is of greater diameter than the diameter of the shank 411a and bears against the edge portion 406. The head 412 gradually increases in width, at each side from the top thereof forwardly to form it with a beveled front face 413. The head 412 is of circular cross-section and its bottom is arranged in proximity to the trough 409. The head 412 of the element 410a is positioned in the path of the driver 224 and functions for the same purpose as the part 237 of the anvil 217. The arrangement of the anvil 396 with respect to the staple former 221 and staple driver 224 is illustrated in full lines in Figure 52. The staple former 221 clears the element 410a and the extension 408 when former 221 is shifted to staple forming position. The spring-controlled plunger or pin 400 is arranged in a socket 414 provided in the casting 398. The socket opens at its lower end. The cam follower or plunger 437 by means of its detent or higher level portion 437a locks the anvil 396 and prevents the latter from turning while the wire is being formed into a staple. The lower level or end 437b of the cam follower or plunger 437 functions to operate the cutter to sever the wire before such plunger comes to rest against the tail of the anvil.

The construction shown in Figure 52 includes the front plate 248. The staple former 221 and staple driver 224 shown in Figure 52 will be of the same form as shown in Figure 20.

The staple pick-up means 397 includes an upstanding staple supporting member 415 which has its upper end extend between the members 247 formed on the plate 248 and into the recess 229 formed in the staple former 221. The member 415 consists of a curved body part 416 having a continuous forward edge 417 of arcuate contour. The rear edge of body part 416 has a rearwardly directed curved lower portion 418 which coacts with the bottom edge 419 of body part 416 to provide a rearwardly directed point 420 at the lower end of said rear edge.

The rear edge of body part 416 is formed with a horizontal portion 421, vertical portions 422, 423 disposed in parallel planes and oppositely disposed inclined portions 424, 425. The portions 421, 425 inclusive provide clearances for the member 415 when it is moved to active position to pick-up, receive and support the formed staple. The body part 416 of member 315 is formed with an inclined top edge 426 and an opening 427 in proximity to its inner upper corner. The member 415 is pivotally connected to and bodily moves with the driver 221. The pivot for the member of finger 415 is indicated 428. Said pivot 428 is secured in the former bar 221 and passes through the opening 427. The body part 416 of member 415 has secured thereto a pin or stud 429, which is arranged in proximity to said rear edge portion 425 and extends laterally in opposite directions with respect to the side faces of body part 416. The function of the pin or stud 429 will be presently referred to.

The pick-up means 397 includes an urging spring 430 for the member 415, and which functions on the downward travel of member 415 to move the same to the dotted line position shown in Figure 52 for the purpose of disposing said member 415 in staple pick-up and supporting position. The spring 430 is of the leaf type and comprises a body part 431 formed of a flat upper portion 432, a flat lower portion 433 and a bow-shaped intermediate portion 434. The portions 432 and 433 are disposed in a like plane. The portion 434 is outwardly off-set with respect to the portions 432, 433. The portion 432 is of materially greater length than the portion 433 and it is anchored to the front face of the plate 248 by the holdfast means 435. The holdfast means 435 are arranged in spaced relation and above the transverse center of the portion 432. The spring 430 is formed with a furcation 436 which provides the lower part of the spring 430 in the form of a pair of spaced arms 437 formed with out-curved upper portions 438 and vertical lower portions 439 and with the lower portions being of less length than said upper portions. The stud 429 normally bears against the outer face of the plate 248, at the bifurcated portion of the latter for the purpose of maintaining that portion of the member 415 below the stud 429 normally in extended relation with respect to plate 248, such as shown in full lines in Figure 52 and with such lower portion extending through the furcation 436 of the spring 430.

When the staple former 221 moves downwardly the member 415 is carried therewith and the stud 429 first rides against the non-cam surface parts of the outer face of the arms 247. When stud 429 passes downwardly off of such surfaces it rides against the cam surfaces 246, and after passing off of said cam surface 246 rides against the portion 433 of spring 430 causing the member 415 to assume the dotted line position shown in Figure 52 whereby the member 415 will be arranged to pick-up and support the staple in the path of the driver 224.

In Figure 52 there is shown the cutter mechanism 344 arranged in relation to the anvil 396. The follower 437 provides a means for intermittently operating the actuating element of the cutter mechanism 344 and for intermittently latching the anvil 396. The follower 437 is intermittently shifted in a direction to operate such actuating element and latch element 396 by the cam 175.

The present invention may be embodied in other specific forms without departing from the spirit or essential attributes thereof, and it is therefore desired that the present embodiments be considered in all respects as illustrative and not restrictive, reference being had to the structure as claimed, rather than to the foregoing description to indicate the scope of the invention.

Having thus described the invention, what is hereby claimed as new and desired to be secured by Letters Patent is:

1. A wire stitching machine having a pivotally suspended horizontally angularly adjustable unit, said unit including a wire thread supporting unwinding guiding supplying and tensioning means, a staple forming and driving mechanism, a wire feeding mechanism, a wire cutting mechanism, a pivoted anvil and a staple supporting member, the said means, mechanisms, anvil and member being correlated, said unit including a driving structure common to said means and mechanisms, an electrically driven operating means for said structure, a controllable means for clutching said operating means to said driving structure to provide for the operation of the latter, and an electrically shiftable means for controlling said controlling means, the said means, mechanisms, anvil and member being bodily movable together on the adjusting of the unit.

2. A wire-stitching machine comprising a pivotally suspended horizontally angularly adjustable unit including an automatically intermittently operable wire supplying structure having inherent braking pressure supplying means and braking pressure modifying means, wire-feeding, cutting and stitching mechanisms, an electric motor, a clutch operatively disposed between said electric motor and said mechanisms and an electrically operable means for controlling the engaging and disengaging of said clutch relative to said motor, controlling means for said electrically operable means including a foot switch located at a point remote from said unit, and controlling means for and located at a point remote from said motor.

3. A wire-stitching machine of the class described including a horizontally angularly adjustable wire-stitching unit, a substantially horizontal pivoted stitching tongue cooperative with said unit and including an arm for suspending the tongue, and means permitting the maintaining of the angular position of the tongue relative to the stitching direction, said means comprising an anchorage portion fixedly associated with said unit formed with a grooved arcuate surface against which an end of said arm bears, and releasable means engaging in said groove for clamping said arm against said surface at different angular positions relative thereto.

4. In a wire-stitching machine of the class described, a vertically disposed pivotally suspended anvil having a side edge formed with laterally extending means at its lower end forming a transverse trough into which a wire strand is adapted to be fed, said edge having a cam projecting laterally therefrom immediately above said trough, said cam being formed to deflect and guide the wire strand into said trough, means for correlation with the top of the anvil fixing said anvil against pivoting at a predetermined phase during the operation of the machine, means for feeding said wire into and through said trough when said anvil is fixed against pivoting, means engageable with said cam at a subsequent phase of each cycle for shifting said anvil into an inoperative position, and fixed stationary means extending through the anvil in proximity to the top of the latter to form the pivoted suspension for the anvil.

5. A wire-stitching machine of the class described adapted to have associated therewith a supply of wire and including a vertically disposed pivotally suspended anvil having a side edge formed with laterally extending means at its lower end providing a trough through which said wire may be fed, means for feeding said wire into said trough in extended relation to the latter, means for severing the wire at a point in proximity to the anvil to form a severed length seating in said trough, means coacting with said means for bending the ends portions of the said severed length of wire to form a staple therefrom, means for driving said staple into the work to be stitched, a common crank disc actuating said staple-forming means and said staple-driving means, a follower actuated by said crank disc and bearing against the top of the anvil for periodically fixing the latter against pivoting, said crank disc and follower being arranged to hold said anvil against pivoting while said wire is being fed into said anvil trough and during the bending operation, and fixed stationary means extending through the anvil in proximity to the top of the latter to form the pivoted suspension for the anvil.

6. In a wire-stitching machine having staple-forming means and staple-driving means both operatively reciprocable between suitable guides and respectively actuated by oppositely disposed connecting links driven from a common crank-pin, a means for increasing the effective dwell period of said staple-forming means at the end of its operative stroke comprising an eccentric rotatably mounted on said common crank-pin and journalled in the crank end of the connecting link actuating said staple-forming means, said eccentric being fixedly related to the connecting link actuating said staple-driving means.

7. In a staple-driving machine, means for supporting a staple during the driving operation thereof, said means comprising a normally upstanding pivotally suspended cam controlled shiftable staple supporting member substantially of arcuate contour adapted operatively to enter between and substantially fill the gap between the legs of the staple and adapted to be supported from the staple forming bar of the machine, an upstanding stationary element having its lower portion provided with a furcation through which extends said member, said element being formed on its outer face with a pair of spaced aligned controlling cams for said member, said member being formed intermediate its ends with a pair of oppositely disposed laterally extending means engageable with said cams on the inwardly shifting of said member, yieldable means connected to said element constantly urging said supporting member into its operative staple-supporting position, and means for progressively thrusting said supporting member aside as the legs of the staple are driven into the work.

8. In a machine for the purpose set forth, a tensioned combined wire-supporting, unwinding, guiding and supplying structure, a wire-feed mechanism positioned below and correlated with said structure, an automatically operable wire stop arranged over and correlated with said mechanism and structure, a staple-forming and driving means, a cutter mechanism disposed between and correlated with said means and feeding mechanism, a pivotally suspended anvil formed on its lower portion with a laterally extended trough forming part and a laterally extended cam arranged over said part, said part and cam correlated with said means, a cam controlled shiftable abutment correlated with the top of said anvil, a pivotally suspended spring urged cam controlled staple support correlated with said part, cam, and means, a main driving structure common to said mechanisms, means and abutment, an electrically operated operating means for said driving structure, said operating means and driving structure having coacting engaging elements for releasably clutching the driving structure to said operating means to provide for the operating of the driving structure, the coacting element of the driving structure being lengthwise movable of the latter, a normally latched controlling means for said coacting elements correlated with said element of the driving structure for controlling the clutching action of said elements, a spring controlled latching means for said controlling means, and electrically operated spring controlled means for releasing said latching means to thereby release said controlling means to provide for the activity of said coacting elements in unison.

9. In a machine for the purpose set forth, a tensioned combined wire-supporting, unwinding, guiding and supplying structure, a wire-feed mechanism positioned below and correlated with said structure, an automatically operable wire stop arranged over and correlated with said mechanism and structure, a staple-forming and driving means, a cutter mechanism disposed between and correlated with said means and feeding mechanism, a pivotally suspended anvil correlated with said means, a cam controlled shiftable abutment correlated with said anvil, a pivotally suspended cam controlled staple support correlated with said anvil and means, a main driving structure common to said mechanisms, means and abutment, an electrical operated operating means for said driving structure, said operating means and driving structure having coacting engaging elements for releasably clutching the driving structure to said operating means to provide for the operating of the driving structure, the coacting element of the driving structure being lengthwise movable of the latter, a normally latched controlling means for said coacting elements correlated with said element of the driving structure for controlling the clutching action of said elements, a spring controlled latching means for said controlling means; and an electrically operated spring controlled means for releasing said latching means to thereby release said controlling means to provide for the activity of said coacting elements in unison, a support common to said structures, means, stop, anvil, abutment, operating means and mechanisms, a supporting structure including a horizontal arm, said support including a part interposed between said tensioned structure and the staple forming and driving means and extending through said arm for pivotally and rotatably mounting said support.

10. In a machine for the purpose set forth, a tensioned combined wire-supporting, unwinding, guiding and supplying structure, a wire-feed mechanism positioned below and correlated with said structure, an automatically operable wire stop arranged over and correlated with said mechanism and structure, a staple-forming and driving means, a cutter mechanism disposed between and correlated with said means and feeding mechanism, a pivotally suspended anvil correlated with said means, a cam controlled shiftable abutment correlated with said anvil, a pivotally suspended cam controlled staple support correlated with said anvil and means, a main driving structure common to said mechanisms, means and abutment, an electrical operated operating means for said driving structure, said operating means and driving structure having coacting engaging elements for releasably clutching the driving structure to said operating means to provide for the operating of the driving structure, the coacting element of the driving structure being lengthwise movable of the latter, a normally latched controlling means for said coacting elements correlated with said element of the driving structure for controlling the clutching action of said elements, a spring controlled latching means for said controlling means; and an electrically operated spring controlled means for releasing said latching means to thereby release said controlling means to provide for the activity of said coacting elements in unison, a support common to said structures, means, stop, anvil, abutment, operating means and mechanisms, a supporting structure including a horizontal arm, said support including a part interposed between said tensioned structure and the staple forming and driving means and extending through said arm for pivotally and rotatably mounting said support, means remote from said support for controlling the operation of the said electrically operated operating means, and means remote from said support for controlling the operation of the electrically operated latching means.

11. In a machine for the purpose set forth, a pivotally suspended anvil decreasing in width from its top to its bottom and provided on its lower portion with a laterally extended trough forming part for receiving and supporting a length of wire during a staple forming operation thereon, a cam operated abutment correlating with the top of the anvil to prevent the anvil from yielding during the staple forming operation, a reciprocatory staple-forming means acting on the wire supported by the anvil, a staple-driving means acting on the staple for driving it to position when the anvil is released and a pivotally suspended spring-urged cam controlled staple pick-up and holder element for picking off the staple from said part, holding the staple and from which the staple is removed and driven by said driving means.

12. In a machine for the purpose set forth, a pivotally suspended anvil formed with a trough for receiving and supporting a length of wire during a staple-forming operation thereon, a cam operated abutment for coaction with the anvil to prevent it from yielding during the staple-forming operation, a reciprocatory staple-forming means acting on the wire supported by the anvil, a staple-driving means acting on the staple for driving it to position when the anvil is released, and a pivotally suspended spring-urged cam controlled staple pick-up and holder element for picking off the staple from the anvil, holding the staple and from which the staple is removed and driven by said driving means, operating means for the staple forming means, said operating means including parts to provide for said staple-forming means dwelling for a period on the staple after the staple-forming operation, and means for operating the staple-driving means to provide for the activity thereof subsequent to staple-forming operation.

13. In a machine for the purpose set forth, a pivotally suspended anvil adapted to receive and support a length of wire during a staple-forming operation thereon, a cam controlled abutment for coaction with the anvil for temporarily preventing it from yielding during the staple forming operation, a reciprocatory staple-forming means acting on the wire supported by the anvil, a staple-driving means acting on the staple to drive it to position when the anvil is released and for moving the anvil clear of the path of said driving means, a shiftable staple pick-up and holder element for picking off the staple from the anvil and holding the staple in the path of and from which the staple is driven by the staple-driving means, operating means for the staple-forming means, said operating means including parts to provide for said staple-forming means dwelling for a period on the staple after the staple-forming operation, and means for operating the staple-driving means to provide for the activity thereof subsequent to the staple-forming operation.

14. A wire stitching machine of the class described including an angularly adjustable stitching unit, a stitching tongue co-operative with and disposed at an angle to said unit, a suspension arm pivotally connected to the tongue, a vertically adjustable anchorage secured to one side of said unit, and releasable means for clamping said arm against said anchorage at different angular positions relative thereto.

15. In a machine for the purpose set forth, a pivotally suspended anvil capable of being moved in opposite directions on its pivot and adapted to receive and support a length of wire during a staple forming operation thereon, means for coaction with the anvil to prevent the latter from moving in one of its directions during the staple forming operation, a reciprocatory staple forming means acting on the wire supported by the anvil, a reciprocatory staple driving means acting on the formed staple to drive it to position when the anvil moves in the said one direction, said anvil being formed with means engageable by said driving means to move the anvil in the said one direction with the staple thereon, and a combined spring and cam controlled shiftable staple pick-up and holder element pivotally suspended from, bodily moving with and operating subsequently to the staple forming means for receiving the staple from the anvil on the movement of the latter in the said one direction for holding the staple in the path of and from which the staple is driven by the staple driving means.

16. In a machine for the purpose set forth, a pivotally suspended upstanding tiltable anvil of substantially right angular triangular form having a front edge provided respectively at its lower portion with a lateral extension having its upper surface formed with a trough and a laterally extended pressure impactable means arranged over and in spaced relation to said trough, and said means providing when pressure is applied thereto for tilting the anvil in one direction.

17. In a machine for the purpose set forth, a pivotally suspended upstanding tiltable anvil, said anvil including a front edge, a trough extending forwardly from said edge and a laterally extended pressure impactable means on said edge, said means arranged over and in spaced relation to said trough, said means providing when pressure is applied thereto for tilting the anvil in one direction, and said means having a rounded bottom and a beveled outer end.

18. In a machine for the purpose set forth, a pivotally suspended anvil capable of being moved in opposite directions on its pivot and adapted to receive and support a length of wire during a staple forming operation thereon, means for coaction with the anvil to prevent the latter from moving in one of its directions during the staple forming operation, a reciprocatory staple forming means acting on the wire supported by the anvil, a reciprocatory staple driving means acting on the formed staple to drive it to position when the anvil moves in the said one direction, said anvil being formed with means engageable by said driving means to move the anvil in the said one direction with the staple thereon, a combined spring and cam controlled shiftable staple pick-up and holder element pivotally suspended from, bodily moving with and operating subsequently to the staple forming means for receiving the staple from the anvil on the movement of the latter in the said one direction for holding the staple in the path of and from which the staple is driven by the staple driving means, said forming means being provided with a recess into which the upper end of said element extends, means for pivoting the said upper end with said forming means, an upstanding face plate arranged forwardly of said driving means having a bifurcated lower portion for the passage of said element and cam surfaces on the lower portion of its outer face, said element being formed intermediate its ends with oppositely disposed laterally extending means for riding against said surfaces, and an upstanding bifurcated spring secured to and offset with respect to said plate, said spring having parts thereof coacting with said surfaces and said laterally extending means for moving the lower portion of said element towards the anvil, on the downward movement of said staple former means to a position to receive the formed staple on the clockwise movement of the anvil.

19. A wire stitching machine of the class described including an angularly adjustable wire stitching unit, an angularly directed stitching tongue co-operative with said unit and having a suspension arm therefor to which the tongue is pivotally connected, means for maintaining the angular direction of said tongue irrespective of the angular setting of said unit, said means comprising an anchorage adjustably connected to said unit and formed with an arcuate part, and releasable means for clamping said arm against said part at different angular positions relative thereto.

20. A wire stitching machine comprising a suspended angularly adjustable stitching unit, a vertically adjustable anchorage secured to and extended from one side of the unit, and a stitching tongue co-operative with said unit and including a suspension arm therefor adjustably connected to said anchorage.

21. A wire stitching machine comprising a suspended angularly adjustable stitching unit, a stitching tongue correlated with and angularly disposed with respect to the unit, a vertically adjustable anchorage secured to one side of the unit and including a laterally extended arcuate part formed with a groove throughout its front edge, a suspension arm for and pivotally connected at its outer end to said tongue, and means correlated with said groove and the inner end of said arm for adjustably connecting the inner end of the arm against said edge.

RUDOLPH E. ZERUNEITH.